United States Patent
Cole, III et al.

(10) Patent No.: US 6,777,641 B2
(45) Date of Patent: Aug. 17, 2004

(54) METHOD AND APPARATUS FOR LASER PIERCING AND CUTTING METAL SHEET AND PLATE

(75) Inventors: Ira E. Cole, III, Rockford, IL (US); William L. Long, Rockford, IL (US)

(73) Assignee: W.A. Whitney Co., Rockford, IL (US)

( * ) Notice: Subject to any disclaimer, the term of this patent is extended or adjusted under 35 U.S.C. 154(b) by 0 days.

(21) Appl. No.: 10/162,321

(22) Filed: Jun. 4, 2002

(65) Prior Publication Data

US 2003/0192865 A1 Oct. 16, 2003

Related U.S. Application Data

(60) Provisional application No. 60/372,885, filed on Apr. 16, 2002.

(51) Int. Cl.[7] .......................... B23K 26/14; B23K 26/16
(52) U.S. Cl. ................. 219/121.67; 219/121.7
(58) Field of Search ................ 219/121.67, 121.68, 219/121.69, 121.7, 121.71, 121.72, 121.6, 121.85

(56) References Cited

U.S. PATENT DOCUMENTS

| | | | |
|---|---|---|---|
| 4,358,659 A | 11/1982 | Spohnheimer | |
| 4,638,145 A | 1/1987 | Sakuma et al. | |
| 5,061,839 A | 10/1991 | Matsuno et al. | |
| 5,063,280 A | 11/1991 | Inagawa et al. | |
| 5,237,148 A | 8/1993 | Aoki et al. | |
| 5,298,716 A | 3/1994 | Ogawa et al. | |
| 5,332,881 A | 7/1994 | Topkaya et al. | |
| 5,434,383 A | 7/1995 | Nakata et al. | |
| 5,607,606 A | * 3/1997 | Mori et al. | 219/121.67 |
| 5,734,146 A | 3/1998 | La Rocca et al. | |
| 5,770,833 A | 6/1998 | Kanaoka et al. | |
| 6,124,565 A | 9/2000 | Morishita et al. | |
| 6,204,473 B1 | 3/2001 | Legge | |
| 6,316,743 B1 | 11/2001 | Nagahori et al. | |
| 6,359,256 B1 | 3/2002 | Biermann et al. | |
| 2002/0147521 A1 | * 10/2002 | Mok et al. | 700/159 |

FOREIGN PATENT DOCUMENTS

| | | |
|---|---|---|
| JP | 8132265 | 5/1996 |
| JP | 8290285 | 11/1996 |
| JP | 9047888 | 2/1997 |
| JP | 2000126888 | 5/2000 |
| JP | 2000237886 | 9/2000 |
| JP | 2001038485 | 2/2001 |
| JP | 2001121280 | 5/2001 |

* cited by examiner

*Primary Examiner*—M. Alexandra Elve
(74) *Attorney, Agent, or Firm*—Leydig, Voit & Mayer Ltd.

(57) ABSTRACT

A controller for laser piercing and cutting metal sheet and plate comprising a computer readable file displayable on a human machine interface display screen of a laser equipped CNC machine tool, communicating with a part program for processing a workpiece, adapted with a plurality of setup data and parameters for piercing and cutting a type and thickness of material, adapted substantially as a table, the table comprising a plurality of parameters, each parameter controlling a unique function of operation and comprising a plurality of steps comprised of a first setup step and a plurality of variable time increment steps, each variable time increment step controlling a portion of the pierce cycle and the table associated with a plurality of parameters controlling cutting the workpiece.

46 Claims, 17 Drawing Sheets

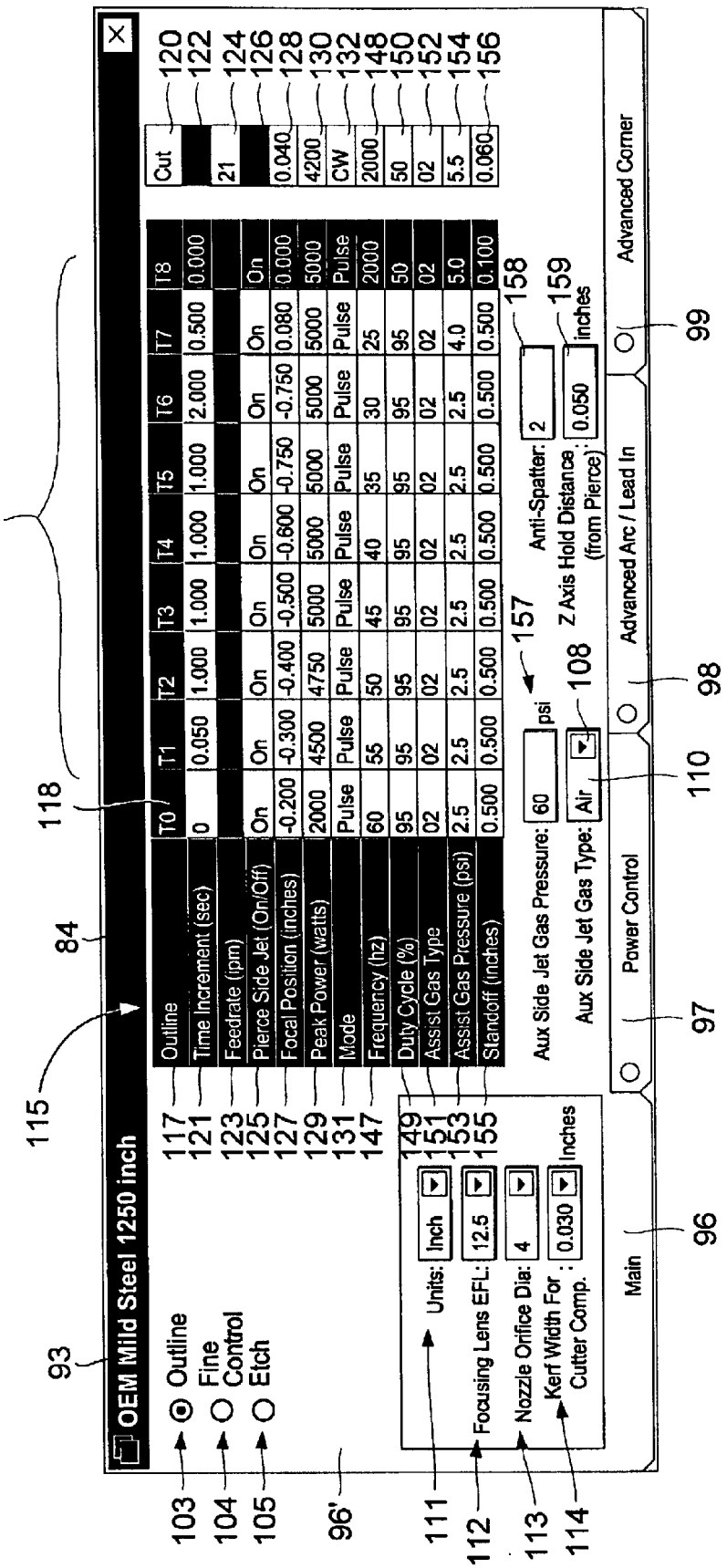

OEM Mild Steel 1250 inch

- ⦿ Outline
- ○ Fine Control
- ○ Etch

| Outline | T0 | T1 | T2 | T3 | T4 | T5 | T6 | T7 | T8 | Cut |
|---|---|---|---|---|---|---|---|---|---|---|
| Time Increment (sec) | 0 | 0.050 | 1.000 | 1.000 | 1.000 | 1.000 | 2.000 | 0.500 | 0.000 | |
| Feedrate (ipm) | | | | | | | | | | 21 |
| Pierce Side Jet (On/Off) | On | On | On | On | On | On | On | On | On | |
| Focal Position (inches) | -0.200 | -0.300 | -0.400 | -0.500 | -0.600 | -0.750 | -0.750 | 0.080 | 0.000 | 0.040 |
| Peak Power (watts) | 2000 | 4500 | 4750 | 5000 | 5000 | 5000 | 5000 | 5000 | 5000 | 4200 |
| Mode | Pulse | Pulse | Pulse | Pulse | Pulse | Pulse | Pulse | Pulse | Pulse | CW |
| Frequency (hz) | 60 | 55 | 50 | 45 | 40 | 35 | 30 | 25 | 2000 | 2000 |
| Duty Cycle (%) | 95 | 95 | 95 | 95 | 95 | 95 | 95 | 95 | 50 | 50 |
| Assist Gas Type | O2 | O2 | O2 | O2 | O2 | O2 | O2 | O2 | O2 | O2 |
| Assist Gas Pressure (psi) | 2.5 | 2.5 | 2.5 | 2.5 | 2.5 | 2.5 | 2.5 | 4.0 | 5.0 | 5.5 |
| Standoff (inches) | 0.500 | 0.500 | 0.500 | 0.500 | 0.500 | 0.500 | 0.500 | 0.500 | 0.100 | 0.060 |

Aux Side Jet Gas Pressure: 60 psi — 102
Aux Side Jet Gas Type: Air ▼ — 108
  N2
  O2
  Air — 109
— 110

Anti-Spatter: 2
Z Axis Hold Distance (from Pierce): 0.050 inches

Units: Inch ▼
Focusing Lens EFL: 12.5 ▼
Nozzle Orifice Dia: 4 ▼
Kerf Width For Cutter Comp.: 0.030 ▼ inches Main | Power Control | Advanced Arc / Lead In | Advanced Corner

FIG. 11

| | Outline | T0 | T1 | T2 | T3 | T4 | T5 | T6 | T7 | T8 | | Cut |
|---|---|---|---|---|---|---|---|---|---|---|---|---|
| | Time Increment (sec) | 0 | 0.050 | 1.000 | 1.000 | 1.000 | 1.000 | 2.000 | 0.500 | 0.000 | | 21 |
| | Feedrate (ipm) | | | | | | | | | | | |
| | Pierce Side Jet (On/Off) | On | On | On | On | On | On | On | On | Off | | |
| | Focal Position (inches) | -0.200 | -0.300 | -0.400 | -0.500 | -0.600 | -0.750 | -0.750 | 0.080 | 0.000 | | 0.040 |
| | Peak Power (watts) | 2000 | 4500 | 4750 | 5000 | 5000 | 5000 | 5000 | 5000 | 5000 | | 4200 |
| | Mode | Pulse | Pulse | Pulse | Pulse | Pulse | Pulse | Pulse | Pulse | Pulse | | CW |
| | Frequency (hz) | 60 | 55 | 50 | 45 | 40 | 35 | 30 | 25 | 2000 | | 2000 |
| | Duty Cycle (%) | 95 | 95 | 95 | 95 | 95 | 95 | 95 | 95 | 50 | | 50 |
| | Assist Gas Type | 02 | 02 | 02 | 02 | 02 | 02 | 02 | 02 | 02 | | 02 |
| | Assist Gas Pressure (psi) | 2.5 | 2.5 | 2.5 | 2.5 | 2.5 | 2.5 | 2.5 | 4.0 | 5.0 | | 5.5 |
| | Standoff (inches) | 0.500 | 0.500 | 0.500 | 0.500 | 0.500 | 0.500 | 0.500 | 0.500 | 0.100 | | 0.060 |
| | Ramp/Step | Step | Ramp | Ramp | Ramp | Ramp | Ramp | Ramp | Ramp | Ramp | | |
| | Beam Size on Focal Optic | S | S | S | S | S | S | S | S | M | | S |

OEM Mild Steel 1250 inch

- ● Outline
- ○ Fine Control
- ○ Etch

Units: Inch
Focusing Lens EFL: 12.5
Nozzle Orifice Dia: 3
Kerf Width For Cutter Comp.: 0.027 Inches Aux Side Jet Gas Pressure: 60 psi
Aux Side Jet Gas Type: Air Anti-Spatter: 1
Z Axis Hold Distance (from Pierce): 0.050 inches Main | Power Control | Advanced Arc / Lead In | Advanced Corner

FIG. 14

| | T0 | T1 | T2 | T3 | T4 | T5 | T6 | T7 | T8 | Cut |
|---|---|---|---|---|---|---|---|---|---|---|
| Outline | | | | | | | | | | |
| Time Increment (sec) | 0 | 0.200 | 0.500 | 0.500 | 1.000 | 0.000 | 0.000 | 0.000 | 0.000 | |
| Feedrate (ipm) | | | | | | | | | | 34 |
| Pierce Side Jet (On/Off) | On | On | On | On | On | Off | Off | Off | Off | |
| Focal Position (inches) | 0.080 | 0.000 | 0.000 | 0.000 | 0.000 | 0.000 | 0.000 | 0.000 | 0.000 | 0.040 |
| Peak Power (watts) | 5000 | 5000 | 6000 | 6000 | 6000 | 2000 | 2000 | 2000 | 2000 | 3700 |
| Mode | CW | CW | CW | CW | CW | Pulse | Pulse | Pulse | Pulse | CW |
| Frequency (hz) | 2000 | 2000 | 2000 | 2000 | 2000 | 2000 | 2000 | 2000 | 2000 | 2000 |
| Duty Cycle (%) | 50 | 50 | 50 | 50 | 50 | 50 | 50 | 50 | 50 | 50 |
| Assist Gas Type | O2 | O2 | O2 | O2 | O2 | O2 | O2 | O2 | O2 | O2 |
| Assist Gas Pressure (psi) | 2.5 | 2.5 | 3.0 | 3.5 | 8.0 | 5.0 | 5.0 | 5.0 | 5.0 | 8.0 |
| Standoff (inches) | 0.375 | 0.375 | 0.300 | 0.200 | 0.040 | 0.100 | 0.100 | 0.100 | 0.100 | 0.040 |

OEM Mild Steel 07500 inch

○ Outline
○ Fine
○ Control
○ Etch

Units: Inch
Focusing Lens EFL: 12.5
Nozzle Orifice Dia: 3.0
Kerf Width For Cutter Comp.: 0.027 Inches Aux Side Jet Gas Pressure: 60 psi
Aux Side Jet Gas Type: Air
Anti-Spatter: 1
Z Axis Hold Distance (from Pierce): 0.050 inches Main

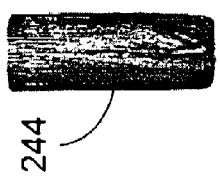
FIG. 17a  FIG. 17c  FIG. 17d  FIG. 17b  FIG. 18

METHOD AND APPARATUS FOR LASER PIERCING AND CUTTING METAL SHEET AND PLATE

CROSS-REFERENCE TO RELATED PATENT APPLICATIONS

This patent application claims the benefit of U.S. provisional patent application 60/372,885 filed Apr. 16, 2002.

FIELD OF THE INVENTION

The present invention relates generally to machine tools, more particularly relates to laser-equipped machine tools for cutting metal sheet and plate and specifically relates to controlling a laser apparatus to pierce and cut metal sheet and plate of various types and thicknesses.

BACKGROUND OF THE INVENTION

A heavy-duty laser equipped Computer Numerical Controlled (CNC) machine tool has been developed for cutting steel, stainless steel, aluminum and other metal sheets and plates within the range of approximately 0.040 to 1.25 inches thick. The machine has been adapted with a 6 kW laser to cut metal plate, and with linear motors to quickly cut thin metal sheet. A flexible means of controlling a piercing cycle and transitioning to a cut is needed for such a machine.

It is advantageous that the piercing, transition and cutting parameters are associated with a particular machine tool rather than being dependant upon a separate programming means. All of a plurality of identical laser equipped machine tools may not cut exactly the same. Differences in age, run time, and time between service intervals can cause laser cutting machines to have different cutting characteristics. When piercing, transition and cutting parameters are associated with or comprise part of a unique machine tool, it is possible to move a part program to any of a plurality of identical machine tools, run it there without change and achieve good results.

It is also advantageous to improve the process of piercing a plate to reduce the piercing time and to minimize the residual heat left in the plate by the piercing process. Reducing the piercing time improves productivity of the machine tool. Minimizing the residual heat left in the plate by the piercing cycle improves the cutting characteristics of the workpiece.

When a laser beam is applied to cut a workpiece, a piercing operation must be performed at the start of the cut. Piercing thinner metal sheets with a laser is a well-established and conventional process. The piercing operation is typically performed with the output of the laser maintained constant, that is, with the continuous wave power level or pulsed beam power level, pulse frequency, and duty cycle maintained constant from start to end of piercing. Piercing thicker metals is difficult and slow with this process, particularly when piercing carbon steel plate with oxygen assist gas. The piercing time for a one-inch thick carbon steel plate utilizing this process, a 6 kW laser, and a cutting head, in which the focal lens position is fixed relative to the cutting nozzle during automatic operation, may be over one minute.

Nakata et al. U.S. Pat. No. 5,434,383 discloses an improved piercing process in which the pierce is started with an initial pulse frequency and an initial pulse duty ratio, and the pulse frequency and the pulse duty ratio are increased by predetermined increments over predetermined time periods. Column 1, lines 12–20, describes piercing thick carbon steel as extremely difficult. The disclosed method of programming a pulse frequency increment and a pulse duty ratio increment fixes the rate of change of the frequency and the duty ratio such that it is linear over the total time period. One of the inventors of the present invention observed operation of a machine tool equipped with a 6 kW laser. The machine tool was equipped with a cutting head in which the focal lens position was fixed relative to the cutting nozzle during automatic operation. The time of piercing a one-inch thick carbon steel plate using the technique disclosed in U.S. Pat. No. 5,434,383 ranged approximately from 20 to 60 seconds. Variations in chemistry and/or surface characteristics of the material cause the great variation in pierce time.

A defocused pierce process is another method for reducing the piercing time of a metal plate. The process is described in Kanaoka et al. U.S. Pat. No. 5,770,833 (though not called therein "defocused pierce process") at column 2, lines 6–20, with reference to FIG. 15. Column 2, lines 21–54 describe problems associated with the process. FIGS. 16A, 16B and 16C of the patent are examples of the upper surface of 12 mm thick mild steel pierced with the process. Columns 2 and 3, lines 55–7 describe the process using a double nozzle. FIGS. 18A and 18B show the upper and lower surfaces of a 12 mm mild steel plate pierced with a double nozzle and the defocused pierce process. The diameter of the pierced hole produced by the double nozzle is approximately twice that of the holes pierced with a conventional or single nozzle.

Carbon steel plate in the range of 0.75 to 1 inch thick can be pierced in 3 to 5 seconds with the defocused pierce process and a 6 kW laser. However, the process is problematic in this range of thickness. The pierced hole is approximately 0.25 to 0.375 inches in diameter. So much material is blown upward that the nozzle and the focal lens are often damaged. The pierced plate is often left very hot impeding the following cutting process. When employing the defocused pierce process on a plate that has many pierced holes, it is advisable to pierce all the holes first then stop and sweep the surface of the plate clean before continuing with cutting the plate. Such requires operator intervention and thus impedes automatic and unattended operation of the machine tool.

Kanaoka et al. U.S. Pat. No. 5,770,833 discloses several improvements to the defocused piercing process. The improvements include the steps of: (1) locating a processing head at a piercing start position such that the laser beam is focused at a point spaced vertically from the surface of the workpiece and offset horizontally from the intended piercing point; and (2) moving, while irradiating with a laser beam and jetting an assist gas, the processing head simultaneously in directions parallel and perpendicular to the workpiece surface, to the piercing point. Further improvements involve the type and/or control of the assist gas.

Topkaya et al. U.S. Pat. No. 5,332,881 discloses a laser cutting head with an automatically adjustable optical focusing system. Column 2, lines 41–43 mentions drilling a workpiece by means of a laser beam. Lines 43–54 describe continuous displacement of the focal point in the direction of the beam during drilling as advantageous for thick workpieces.

BRIEF SUMMARY OF THE INVENTION

The inventors have developed a flexible method and apparatus for controlling laser piercing of metal sheet and plate and transitioning to a cut. A controller is configured such that pierce and cut control parameters are associated with and comprise part of a unique laser equipped machine tool. A piercing cycle is subdivided into a number of sequential increments, and the time duration of each increment is individually selectable, as are the machine operating parameters. The controller is flexible such that a piercing cycle can be optimized for type of material, i.e. mild steel, alloy steel, stainless steel, aluminum, etc., and for material thickness. Further, the controller is adapted such that parameters controlling laser mode, power, pulsing characteristics, focal position, and assist gas pressure can be changed and auxiliary functions can be selectively engaged and disengaged within the pierce cycle.

Preferably the controller is resident in either the CNC of a laser equipped machine tool or another computer communicating with the CNC. The term "computer system" will be used herein as a generic description of the multiple types of computer configurations found in machine tools of this type. The terms "CNC" and "computer system" are inclusive of one or more of such systems connected in a computer network. In a preferred embodiment, the controller includes a Material Parameter Library which is comprised of a plurality of computer readable files. An individual file is herein called a Material Parameter Library file, a MPL file, or a MPL record. The Material Parameter Library can be considered a database and may be comprised as such. The Material Parameter Library resides in a directory, herein called a Material Parameter Library (MPL), a MPL directory, or a MPL database, of a computer that serves as or is associated with a CNC control (i.e., the computer system) controlling operation of a laser equipped machine tool. When the computer system is configured in this way, a part program, operating in the CNC, can operate on information from particular files in the Material Parameter Library and utilize the parameters stored in a particular MPL file or a plurality of particular MPL files to accomplish the process required by the part program. This is particularly significant in piercing of the workpiece, where the library can include a number of tables, which will be described below, which provide sets of parameters intended to be operated in sequence to control the laser machine operation to perform piercing optimized to the particular type of workpiece being operated on by the part program.

In greater detail, and according to a specific implementation of the invention, the Material Parameter Library contains a plurality of OEM MPL files and/or User MPL files wherein each file contains parameters to pierce and cut a specific type, alloy, and thickness of material. The pierce cycle of any file is subdivided into a plurality of sequential increments, with the time duration (and machine parameters) for each increment being individually selectable. Opened on an operator station of a laser-equipped CNC machine tool, the MPL file appears on a visual display screen and comprises part of the Human Machine Interface, HMI. An MPL file serves, in conjunction with a part program, the CNC control, a laser apparatus, a cutting head with related apparatuses, and cutting related auxiliary apparatuses, as a controller for controlling a pierce cycle for laser piercing metal sheet and plate and transitioning to a cut. An MPL file can be called from a part program or can be selected and loaded from the operator station.

The term OEM of OEM MPL file is used by example and not by limitation. The term OEM is intended as a means to identify MPL files that are prepared and furnished by the Original Equipment Manufacturer, OEM, the manufacturer of the laser-equipped machine tool. As such, an OEM MPL file can be identified by any unique term selected by the OEM. An OEM MPL file is a protected file that is "read only" to the machine tool owner/operator(s) and is updateable by the Original Equipment Manufacturer or is updateable by an owner/operator such that the OEM MPL file content is controlled by the OEM. Preferably, the computer storing the Material Parameter Library is adapted such that OEM MPL files are remotely updateable by the OEM. The time duration of the increments and the parameters are considered "selectable" in the broadest sense, even though in an OEM MPL file they are not directly selectable by the user. They are selected by the OEM and, with controls are made selectable by the user.

The term User of User MPL file is used by example and not by limitation. The term User is intended as a means to identify the creator of a User MPL file that is prepared by an owner or operator of the laser-equipped machine tool. As such the term User is typically the name, initials, nickname or other identifying term of the person that created the User MPL file.

An MPL file is adapted substantially as a table with fields that control a unique function or parameter of operation. OEM MPL files are furnished with the laser equipped machine tool as a starter set. OEM MPL files are developed with intent for robust operation. They have been proven to work well cutting a specific type and thickness of metal and typically have been tested on material from several suppliers.

A User MPL file is one developed for a type or thickness of material not included in the OEM Material Parameter Library or for a special circumstance. An operator creates a User MPL file by opening a New MPL file, or by copying an OEM or a User MPL file and renaming and saving it. The operator then develops the file by editing its parameter fields and saving the edited file.

It is a feature of the invention that a MPL Manager is provided to help a machine operator find a particular MPL file. The MPL Manager is adapted to conduct searches for MPL files, open, copy, or delete MPL files and to create new MPL files.

It is a feature of the invention that a pierce cycle is adapted as a plurality of variable time increment steps in which the duration of each step is selectable, in some cases by the OEM, and in other cases by the user. In the specific example described in the specification, though more or fewer steps could be adapted, the inventors have adapted nine, labeled T0 through T8. The duration of a step is established by entering a value in a table parameter field labeled "Time Increment (sec)". Each step is associated with a plurality of parameter fields, each parameter field controlling a feature of the cycle.

T0 is a preparatory step. The T0 step sets the initial state or value of each parameter before subsequent steps are processed.

It is a feature of the invention that all steps do not have to be used. Setting the time increment of a step to 0.000 deactivates that and subsequent steps. The background color of deactivated steps is changed to show they are inactive.

It is a feature of the invention that the parameter fields of the deactivated steps do not have to be set to an inactive value. Parameter data in a deactivated step is ignored.

In a preferred embodiment of the invention, changed parameter values, other than on, off, and gas type are activated by linearly ramping the change across the time increment of the step. An alternate embodiment of the invention includes a parameter field settable such that a changed parameter value, other than on, off, and gas type, is alternatively changed at the beginning of the step time period or ramped across the step time period.

It is another feature of the invention, in transitioning from a pierce to a cut, that the axis controlling the position of the cutting nozzle relative to the surface of the workpiece can be held in last vertical position for a selectable distance into the cut. The vertical position can be temporarily held to prevent a nozzle position control system from reacting to any residue around the top of the pierced hole.

It is a further feature of the invention that a MPL file is optionally adapted with or is associated with one or more other control means also adapted substantially as a table(s) and controlling another aspect of a laser cutting process of a laser equipped machine tool.

In a preferred embodiment of the invention, the MPL file controls a cutting head that has a cutting nozzle that is adapted with a plate surface sensor preferably a capacitive sensor apparatus. References to a capacitive sensor herein are intended to broadly encompass plate surface sensors including those using non-capacitive sensing mechanisms. In practice the cutting head is positioned in the Z-axis by a servomotor. The capacitive sensor senses the distance between the cutting nozzle and the workpiece and provides a feedback signal to the Z-axis servo system to maintain the nozzle to workpiece distance at set value. Currently available capacitive sensor systems are inherently limited to a practical range of operation of approximately 0.004 to 0.400 inch.

In one example of use of the invention, in piercing plate it is sometimes advantageous to move the cutting nozzle to a position above the plate, called a standoff position, which is out of the operational range of the capacitive sensor, for example 0.500 inch. In practicing this example of the invention a second and alternate feedback apparatus is adapted to the servomotor that drives the Z-axis. The T0 step of the invention is adapted with an embedded cycle; Find Plate, for finding the workpiece. When the cutting head is moved from the end of a cut to a piercing position for the next cut it is often carried at a retracted position well above the workpiece to reduce risk of collision with an upturned part. Upon reaching the piercing position the pierce cycle is initiated. The T0 step first runs the Find Plate cycle. The Z-axis lowers the cutting head with the capacitive sensor active, senses the workpiece and positions the cutting nozzle to a standoff position that is set within the embedded cycle, i.e. 0.050 inch. Then the Z-axis feedback is switched from the capacitive sensor to the alternate feedback. Then the cutting head is raised positioning the cutting nozzle to the standoff position associated with the T0 step, 0.500 inch in this example. The entire pierce cycle is performed with the Z-axis controlled by the alternate feedback apparatus. At the transition to the cut, the alternate feedback remains in control of the standoff distance for a Z-axis hold distance. Upon cutting the Z-axis hold distance, the feedback is switched from the alternate feedback to the capacitive sensor for the remainder of the cut.

The invention also has method aspects. Particularly, the invention relates to a method of controlling piercing and a transition to cutting in a laser-equipped machine tool. A Material Parameter Library is provided and stores a plurality of sets of pierce cycle parameters for a plurality of material types. Pierce cycles are subdivided into a plurality of sequential increments and the duration of each increment, as well as the machine parameters operative for that increment, are separately specified for each increment. When a pierce cycle is required, such as by operation under a part program, information from a MPL record is accessed which relates to the type of material being processed. The record includes a sequence of sets of machine settings or other parameters (each set corresponding to one of the increments), and an operating time associated with each such set. The parameters in the sequential sets are established for optimized piercing of the type of material at issue. When the record is accessed, it serves to control the laser-equipped machine tool according to the sets of stored parameters in sequence for the stored operating time of each set in order to perform the pierce cycle. One of the parameters for piercing is configurable as a transition parameter, during which the machine parameter is maintained at the levels set in the record and under the control of the alternate position feedback mechanism so that the cut can be commenced without disturbance from any material surface imperfections around the pierced hole.

These and other objectives and features of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is an illustration of the MPL file 84 shown in the display window of FIG. 2.

FIG. 5 is the same as FIG. 3 but additionally illustrating a combo selection box.

FIG. 11 is an illustration of a MPL file display like FIG. 3 except having additional parameters associated with the pierce cycle.

FIG. 14 is an illustration of the invention adapted to control the features of FIG. 13.

FIGS. 17a–17d are a composite photograph of the top, side, bottom and end of a sample part processed by the invention.

FIG. 18 is an enlarged photograph taken along 18—18 FIG. 17 after milling away the surface to expose the pierced holes.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
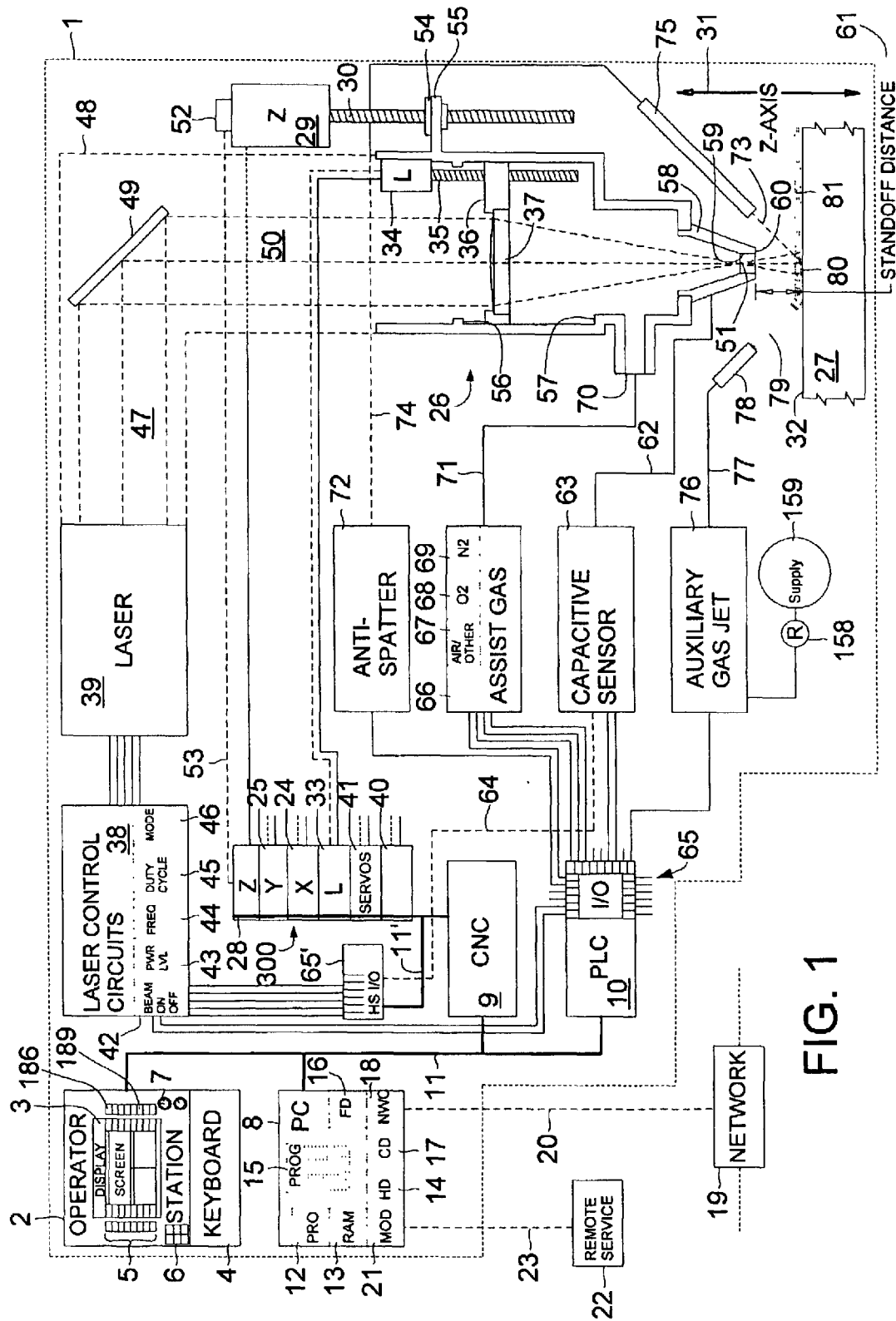
FIG. 1 is an illustration of features of a preferred embodiment of a laser-equipped machine tool that are controllable by the invention.

FIG. 1 illustrates features of a preferred embodiment of a laser-equipped CNC machine tool 1 controllable by the invention. While this machine tool configuration is preferred, it is not the only configuration with which the invention can be used and is described as an exemplary environment. An operator station 2, the Human Machine Interface, HMI, to the machine tool 1, includes a visual display screen 3, a keyboard 4, and a plurality of pushbuttons 5, switches 6, and control knobs 7 for operation of the machine tool. Operator station 2 communicates with a computer system which includes a PC 8, a CNC 9 and a programmable logic controller, PLC 10, by means of a communication bus 11.

The PC 8 communicates with the operator station 2, the CNC 9 and the PLC 10 by means of the communication bus 11. PC 8 has a processor 12, a random access memory section 13, and a storage means, in this case a hard drive 14, to store a part program 15 and other software files, software applications and/or part programs. PC 8 communicates or feeds the part program to the CNC. Optionally, the PC 8 has a floppy drive 16 and/or a compact disc drive 17 for loading and/or saving software files. Additional optional features are a network card 18 for connecting to a computer network 19 by means of a network cable 20 and/or a telephone modem 21 for communication with a remote factory service site 22 by means of a telephone line 23.

The CNC 9 communicates with the operator station 2, the PC 8 and the PLC 10 by means of the communication bus 11. CNC 9 communicates with servo drives 300 and a plurality of High Speed Input/Output modules 65' via a communication bus 11'. CNC 9 controls a X-axis servo drive 24 and a Y-axis servo drive 25 to cause relative motion between a cutting head 26 and a workpiece 27 along a controlled path to cut a hole in or a part from the workpiece 27. The CNC 9 also controls a Z-axis servo drive 28 driving a servomotor 29 driving a translation screw 30 to position the cutting head 26 along a Z-axis 31 and relative to an upper surface 32 of the workpiece. The CNC also controls a L-axis servo drive 33 that drives a servomotor 34 driving a translation screw 35 that moves a lens holder 36 carrying a focal lens 37. The CNC 9 also controls a laser 39 via the plurality of High Speed I/O modules 65', the PLC 10 and the I/O modules 65 and a plurality of laser control circuits 38. Optionally, the CNC may control other servo drives 40 and 41 controlling other servo driven apparatuses of the machine tool 1.

The laser control circuits 38 are comprised of a beam on/off control circuit 42, a power level control circuit 43, a frequency control circuit 44, a duty cycle control circuit 45, and a mode select circuit 46.

The laser 39 emits a beam 47 through an enclosed beam path 48 to a bending mirror 49. The beam 47 is reflected from the mirror 49 along a path 50 and through the focal lens 37 that causes the beam to converge to a focal spot 51 shown positioned above the workpiece 27.

The Z-axis servomotor 29 has a position feedback apparatus 52 that is connected to the Z-axis servo drive 28 by feedback cable 53. The translation screw 30 drives a nut 54 mounted on a bracket 55 attached to the cutting head 26. The lens holder 36 is adapted to slide within the cutting head 26 within a range of travel defined by an upper abutment 56 and a lower abutment 57. The cutting head 26 has a nozzle 58 that has an orifice 59 surrounding the focus spot 51. The distance between the lower face 60 of the nozzle 58 and the upper surface 32 of the workpiece 27 is called the standoff distance as shown at 61. The nozzle 58 is connected by a electrical conductor 62 to a plate surface sensor, preferably a capacitive sensor apparatus 63 that provides a feedback signal via feedback cable 64 to the Z-axis servo drive 28 via the High Speed I/O modules 65'. The capacitive sensor apparatus 63 also communicates with a plurality of input/output, I/O, modules 65. The plate position sensor is sometimes referred to herein as a primary feedback sensor or mechanism, and the position feedback 52 associated with the servomotor as an alternative feedback sensor or mechanism.

The cutting head 26 is an example of a preferred type of a cutting head rather than itself being a preferred embodiment. It is preferred that the cutting head 26 has a servo positioned focal lens. Other similar cutting heads, such as disclosed in Matsuno et al. U.S. Pat. No. 5,061,839, Ogawa et al. U.S. Pat. No. 5,298,716 and Topkaya et al. U.S. Pat. No. 5,332,881 are also preferred types of cutting heads. A cutting head disclosed in Legge U.S. Pat. No. 6,04,473 is a preferred embodiment of a cutting head.

The PLC 10 is adapted with a plurality of input/output, I/O, modules 65 that control various features of the machine tool. A plurality of modules 65 control an assist gas apparatus 66 comprised in part of an air/other gas supply apparatus 67, a oxygen supply apparatus 68 and a nitrogen supply apparatus 69. The assist gas apparatus 66 delivers an assist gas at specified pressure to a port 70 in the cutting head 26 via a conduit 71. The assist gas flows through the cutting head then through the nozzle orifice 59 and assists the piercing and/or cutting process.

Another I/O module 65 controls an auxiliary anti-spatter apparatus 72 that delivers a controlled amount of an anti-spatter agent 73 to the workpiece 27 via a conduit 74 and a nozzle 75. A preferred anti-spatter agent 73 is Spatter Block HT, Liquid manufactured by J. Walter Inc., Hartford Conn. Other similar products are also suitable. Optionally, a controlled amount of anti-spatter agent is applied before a workpiece is pierced. The amount of agent applied is controlled such that it is typically consumed during the pierce. The agent is particularly helpful when piercing thick material. It reduces the tendency of material blown from the pierced hole to build up around the top of the hole. In some instances a noticeable reduction in piercing time has been achieved by use of an anti-spatter agent. The agent appears to reduce the reflectivity of the material surface improving the transfer of energy from the laser beam to the workpiece. Use of an anti-spatter agent is optional and is normally not necessary when piercing thinner materials.

Another I/O module 65 controls an auxiliary gas jet apparatus 76. The auxiliary gas jet apparatus 76 delivers, via conduit 77 and nozzle 78, a jet of gas 79, typically compressed air, during the piercing cycle to assist the piercing process. The jet of gas 79 is positioned forward of the piercing point 80 and aimed such that it flows across the piercing point substantially parallel to the upper surface 32 of the workpiece 27 as indicated at 81.

The jet of gas 79 is particularly useful when piercing thick material. When thick material is pierced a substantial quantity of molten material is blown upward from the pierced hole. Particles of molten material can be blown from the pierced hole with such energy that they climb the gas stream and solidify on the focal lens 37 thereby damaging or destroying the lens. Molten particles can also resolidify on and build up on the cutting nozzle 58 damaging the nozzle and hindering operation of the capacitive sensor apparatus 63 and/or disrupting the gas flow through the nozzle orifice 59. The jet of gas 79 blows the molten debris away from the pierce point protecting the nozzle 58 and the focal lens 37 while leaving the top of the pierced hole relatively free of debris.

Figure 2:
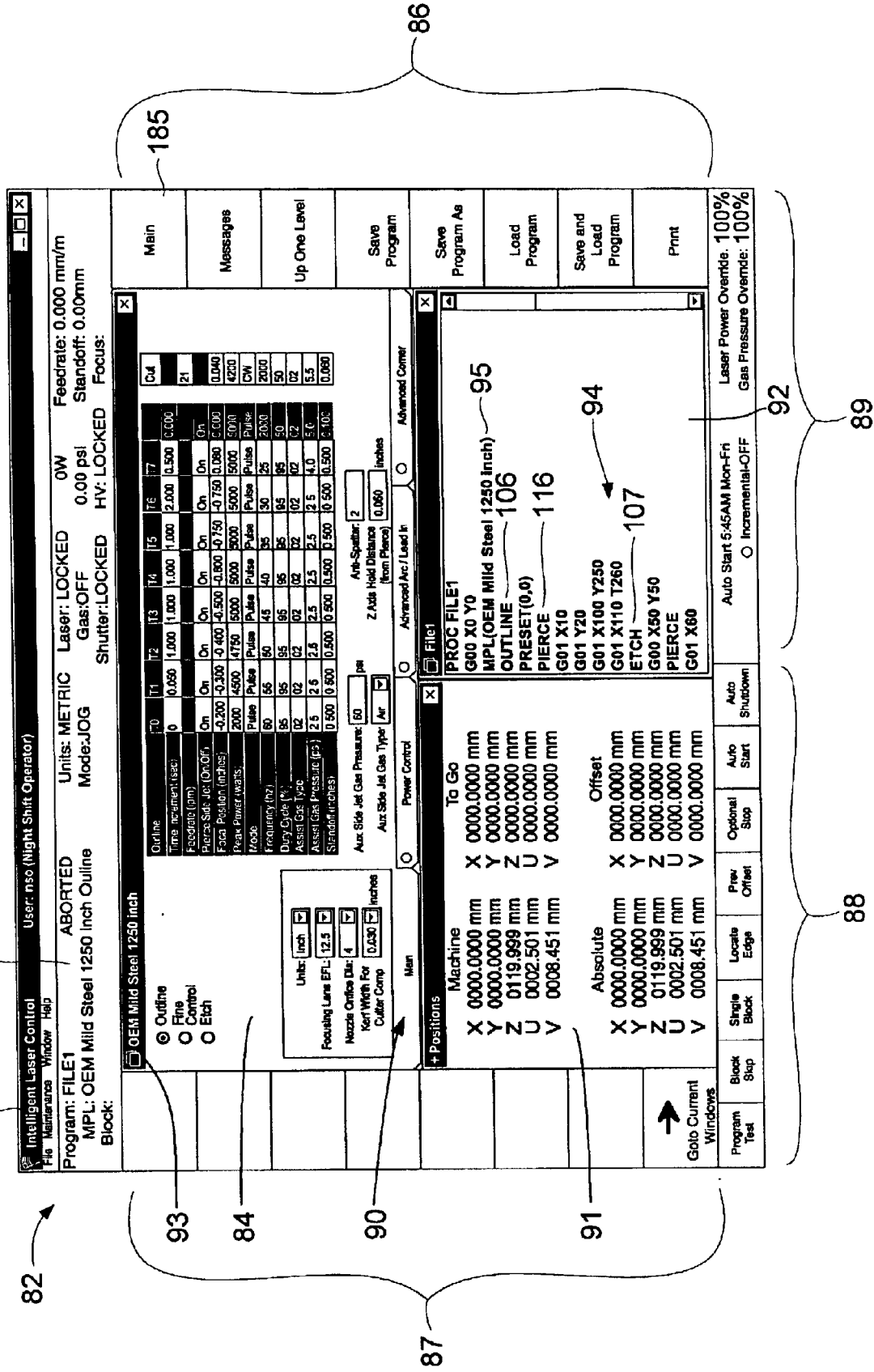
FIG. 2 is an illustration of a visual display screen embodying the invention.

FIG. 2 is an illustration of a visual display screen 82 illustrating features of the invention. The illustration is of a screen print from a machine tool operator station having a Windows NT software application called Intelligent Laser Control 83. The Intelligent Laser Control software application 83 is a development of and available from W. A. Whitney Co., Rockford, Ill. The Intelligent Laser Control software is designed to run on the front end PC of a laser-equipped machine tool and comprises part of the Human Machine Interface (HMI) of the machine tool. The Intelligent Laser Control software application 83 provides machine status information, means to perform various machine maintenance functions, means to log data, and means to handle part programs.

In accordance with the invention, a Material Parameter Library file (MPL file) 84 is provided and is configured as a controller for the laser-equipped machine tool. A plurality of such MPL files, each file containing parameters for piercing and cutting a specific type, alloy, and thickness of material, comprise a Material Parameter Library. In the present example of the invention, the Material Parameter Library file 84 is associated with the Intelligent Laser Control software 83 such that the Intelligent Laser Control software can identify and access individual MPL files within the MPL and utilize the parameters and cycles stored in those files to preprocess the part program for controlling the machine tool. As a further example, when the Intelligent Laser Control software application 83 is preprocessing a part program, it identifies and accesses individual MPL files, retrieves information stored therein, prepares control files for the computer system, and inserts "behind the scene" commands into the part program. "Behind the scene" means the part program seen by the machine operator is not changed. When the computer system executes the program the workpiece is processed according to the selected MPL file(s).

The display screen 82 is comprised of a status bar area 85 across the top, a soft key menu area 86 along the right side, a soft key menu area 87 along the left side, a function key area 88 along the left bottom, a smaller status bar area 89 along the right bottom, and a display window area 90 proximate to the center of the screen. Shown in the display window area 90 are the MPL display 84, a machine position display 91 and a part program display window 92. The displays shown in the display window area can be arranged differently. The display window area 90 can also be configured to display other machine operation and/or maintenance displays instead of those shown.

FIG. 3 is an illustration of the MPL file display 84 shown in the display window of FIG. 2. The MPL file name is displayed in a text field 93. An MPL file can be loaded from the operator station or can be called from within the part program. Referring to the program display window 92 FIG. 2, the MPL file name "OEM Mild Steel 1250 inch" is shown in the text field 93 and is called within a part program 94 by a command MPL (OEM Mild Steel 1250 inch) 95. The format of the command 95 is MPL (filename). When a MPL file is called from a part program it is processed automatically. It is not necessary for the MPL file to be displayed on the screen to be active. However, the machine operator may choose to display the MPL file for reference.

Referring again to FIG. 3 the tab Main 96 identifies the MPL file page which when operated on by the computer processor 12 FIG. 1 renders the MPL file a controller 96' having a plurality of basic parameters for piercing and cutting a workpiece. These parameters control the machine tool unless other parameters are activated and override the Main settings. Associated tabs lead to other control pages controlling other aspects of the laser cutting process. The following control page descriptions and illustrations are given by example and not by limitation. A Power Control tab 97, an Advanced Arc/Lead In tab 98, and an Advanced Corner tab 99 are MPL file pages with associated control parameters controlling other aspects of the laser cutting process.

Figure 4A:
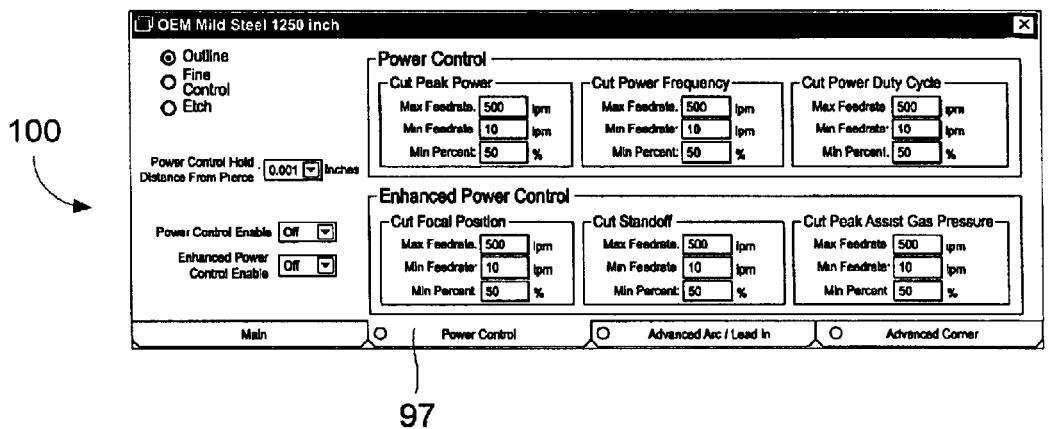
FIGS. 4a, 4b, and 4c are illustrations of visual display screens of other control means associated with the invention.
Figure 4B:
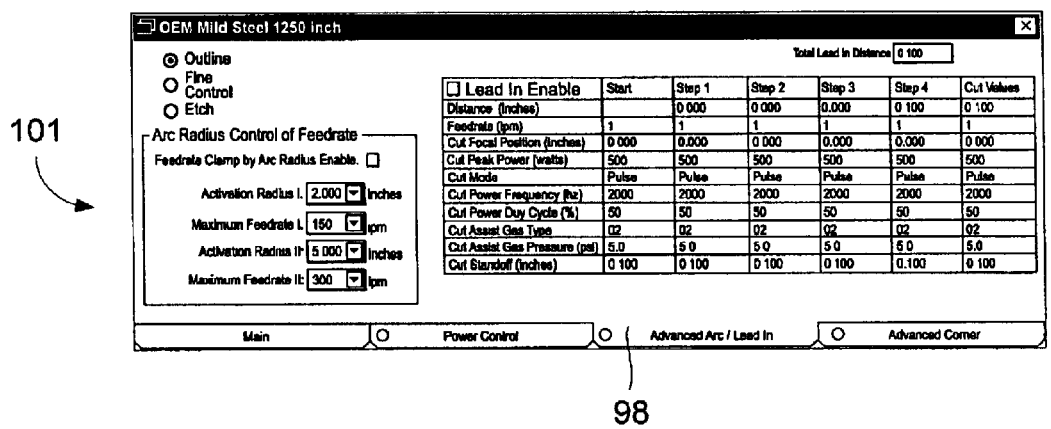
Figure 4C:
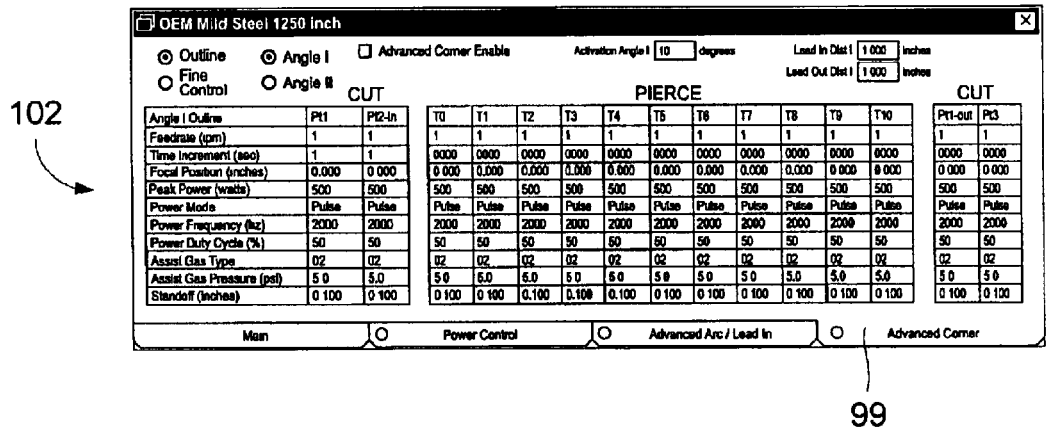

The Power Control tab 97 FIG. 3 displays a control page 100 FIG. 4A for controlling the laser power and other parameters according to actual feedrate. The Advanced Arc/Lead In tab 98 FIG. 3 displays a control page 101 FIG. 4B for controlling the feedrate with respect to the cut path arc radius and all cutting parameters within a Lead In (the transition from a pierced hole to cutting a part feature). The Advanced Corner tab 99 FIG. 3 displays a control page 102 FIG. 4C for operating parameters when corners are encountered in the part program. The control pages 100 FIG. 4A, 101 FIG. 4B, and 102 FIG. 4C are associated with the MPL file 84. The parameters of control pages 100 FIG. 4A, 101 FIG. 4B, and 102 FIG. 4C are settable to optimize the cutting process for a specific type, grade and thickness of material. When activated, the parameters of control pages 100 FIG. 4A, 101 FIG. 4B, and 102 FIG. 4C temporarily override, enhance or provide additional control parameters associated with the Cut 120 FIG. 3 parameters during the transition from pierce to cut or when cutting specific features of geometry. It is optional that none, some, or all of the control pages 100 FIG. 4A, 101 FIG. 4B and 102 FIG. 4C are used. In an alternate and simplified embodiment of the invention, to be discussed later, the MPL file is not associated with other control pages.

Referring to FIG. 3 an Outline option button 103, a Fine Control option button 104 and an Etch option button 105 are option buttons allowing selection of one of three operating modes. Picking Outline, Fine Control or Etch of the Main control page 96' also selects Outline, Fine Control or Etch of associated parameters of control pages 100, 101 and 102. The selection is identified by the lit option button symbol ☉.

The Outline selection button 103 is associated with cutting parameters suitable for cutting larger or coarse features of part geometry. Outline cutting parameters are callable from a part program by an OUTLINE command, 106 FIG. 2, or a M90 command. The OUTLINE command, control code M90 and following commands and control codes are given by example and not by limitation.

The Fine Control option button 104 is associated with cutting parameters more suitable for cutting smaller or finer features of geometry. Fine Control cutting parameters are callable from a part program by a FINE command or by a M91 control code.

The Etch option button 105 is associated with parameters suitable for laser etching a character, mark or feature of geometry into a part. Etching parameters are callable from a part program by a ETCH command, 107 FIG. 2, or by a M92 control code.

Continuing with FIG. 3, the MPL file 84 has several combo boxes. A combo box has an associated symbol 108. Referring to FIG. 5, clicking on the symbol 108, with a computer input device such as a mouse, offers a list of choices. Highlighting a selection, for example Air 109, with the computer input device, then clicking on it, would load the selection to an associated combo box 110.

A Units combo box 111 FIG. 3 offers two choices, Inch or Metric, with Inch the default. All MPL file parameter fields display values in the system of measurement units selected, unless otherwise noted. If the Units box 111 is toggled, displayed data is automatically converted. The units of measurement for a part program are selectable from the part program by entering a G70 code for Inch or a G71 code for Metric. If the Units mode of the selected MPL file is different than the Units mode of a selected part program, the parameters of the MPL file are automatically converted to the units of the part program when the MPL file is loaded or called.

A Focusing Lens EFL combo box 112 identifies the Effective Focal Length of the lens to be used to process a workpiece. The Focusing Lens EFL box 112 offers the choices that are available for use in the machine tool. For example, if the machine tool can use 7.5 inch, 10.0 inch 12.5 inch and 15.0 inch focal length lenses, the Focusing Lens EFL box 112 would offer those choices. In a preferred embodiment of the invention, the combo box 112 is a reference advising the effective focal length of the lens 37 FIG. 1 to be used to cut the workpiece 27. The combo box 112 is adaptable to be associated with a sensor and issue a warning if the correct lens is not installed in the cutting head. The combo box 112 is also adaptable to be associated with a cutting head changer apparatus or a lens changer apparatus such that the specified focal length lens is installed for cutting the workpiece.

In a preferred embodiment the measurement units of the Focal Lens EFL box 112 are always displayed in inches. In an alternate embodiment the units of the Focal Lens EFL box are always displayed in millimeters. In another embodiment the units of the Focal Lens EFL box are displayed as selected in the Units box 111.

A Nozzle Orifice Dia. combo box 113 FIG. 3 identifies the cutting nozzle to be used to process the workpiece. The Nozzle Orifice Dia. box 113 offers the choices that are available for use in the machine tool. In a preferred embodiment of the invention, the combo box 113 is a reference identifying the nozzle 58 FIG. 1 to be used to cut the workpiece 27. The combo box 113 is adaptable to be associated with a sensor and issue a warning if the correct nozzle is not installed in the cutting head. The combo box 113 is also adaptable to be associated with a nozzle changer apparatus such that the specified nozzle is installed for cutting the workpiece.

In a preferred embodiment the measurement units of the Nozzle Orifice Dia. box 113 always displayed in millimeters. In an alternate embodiment the units of the Nozzle Orifice Dia. box 113 box are always displayed in inches. In another embodiment the units of the Nozzle Orifice Dia. box 113 box are displayed as selected in the Units box 111.

A Kerf Width for Cutter Comp. text box 114 FIG. 3 contains a number determining the amount of cutter compensation applied to the cut path to compensate for the amount of material removed in the kerf. The cutter compensation number and associated program codes, M40 kerf comp off, M41 kerf comp added to the left side of the cut path, and M42 kerf comp added to the right side of the cut path, selectively changes the path of the laser beam on the workpiece such that the produced part corresponds to intended dimensions. The number is displayed in units selected in the Units box 112.

In the example of FIG. 3, a table 115 comprised of 10 columns and 12 rows, when accessed by the processor defines and controls a pierce cycle. The pierce cycle defined by the table 115 is callable from a part program by a PIERCE command 116 FIG. 2. Row 1 column 1 of the table 115 is a header box 117. The header box 117 contains the name of the selected operating mode. The selected operating mode in FIG. 3 is Outline 103 thus header box 117 contains the word Outline.

Row 1 column 2 of table 115 is a column header box 118 labeled T0, the name of the first pierce step. The parameters associated with the T0 step 118 are preparatory. They set the initial state or value of each row parameter before subsequent steps are processed. The T0 step is also adapted with an embedded cycle, Find Plate, for finding the upper surface 32 of the workpiece 27. When the cutting head 26 is moved from the end of a cut to a piercing position for the next cut it is often carried at a retracted position well above the workpiece to reduce risk of collision with an upturned part. Upon reaching the piercing position the pierce cycle is initiated starting with step T0. The T0 step 118 first executes the Find Plate cycle functioning as follows. The Z-axis assembly lowers the cutting head with the capacitive sensor 63 active, the workpiece is sensed and the cutting nozzle is positioned to a standoff position 61 that is set within the embedded cycle, i.e. 0.050 inch. The Z-axis feedback is switched from the capacitive sensor to the alternate feedback 52. Then the cutting head is raised positioning the cutting nozzle to the standoff position 61 associated with the T0 step, 0.500 inch in FIG. 3. The entire pierce cycle is performed with the Z-axis controlled by the alternate feedback apparatus 52. After completing the Find Plate cycle and setting the other associated parameters at indicated values, the remaining pierce cycle is preformed by processing the active steps of the pierce steps T1 through T8.

Row 1 columns 3 through 10, 119, of the table 115 are labeled T1 through T8 respectively. T1 through T8 identify pierce cycle steps. More or fewer steps could be adapted but eight have thus far been adequate. Each pierce cycle step is associated with a plurality of parameter fields, rows 2 through 11, each parameter field controlling a feature of the pierce cycle.

To the right of table 115 is a single column of parameters 120 labeled Cut. The Cut parameters 120 control the cutting process after transition from a pierce cycle to cutting a workpiece.

Column 1 row 2 of table 115 is a parameter identification box 121 labeled Time Increment (sec). Row 2 columns 3 through 10, associated with steps T1 through T8 respectively, store time increment parameters for each pierce step. The duration of a step, in seconds to three decimal places, is a variable controlled by the number in the parameter box associated with that step. The duration of steps T1 through T8 can all be the same, all be different, or be any combination thereof. The duration information for each step is individually settable or selectable.

It is a feature of the invention that it is not required to use all of the pierce steps T1 through T8. Setting the time increment of a step to 0.000 deactivates that and subsequent steps and the associated parameters. The background colors of deactivated steps are automatically changed to indicate they are inactive as shown in column T8 of table 115. Parameter data in a deactivated step is ignored.

In a preferred embodiment of the invention, it is a requirement that all parameter boxes have an entered value to satisfy software checks. Therefore a new MPL file contains default parameter values. The parameter values in column T8 of table 115 are default values. An alternate embodiment of the invention can have empty parameter boxes.

Row 2 of the Cut parameter column is a blank parameter box 122. Time increment steps are not required during cutting. Therefore there is no time increment step parameter in the Cut parameters. Thus Cut parameter box 122 is a blank box.

Column 1 row 3 of table 115, FIG. 3, is a parameter identification box 123 labeled Feedrate (ipm). The label 123 changes to Feedrate (mm/min) when the Units parameter 111 is Metric. The feedrate parameter boxes associated with steps T1 through T8 are blank. The piercing cycle is executed with the cutting head horizontally fixed in position relative to the workpiece thus a feedrate is not required. Therefore, no feedrate parameters are associated with pierce steps T0 through T8.

The Cut parameter column 120 has a Feedrate parameter 124. The Feedrate parameter 124 sets the feedrate, the horizontal translation velocity between the cutting head and the workpiece, during the cutting process. Thus, cut parameter box 124 has information entered determining the feedrate for cutting the workpiece.

Column 1 row 4 of table 115 is a parameter identification box 125 labeled Pierce Side Jet (On/Off). The Pierce Side Jet (On/Off) parameters associated with pierce steps T0 through T8 turn on or off the auxiliary gas jet 76 FIG. 1. Row 3 of the Cut 120 parameter column is a blank box 126 because the auxiliary side jet is not used during cutting. The auxiliary side jet is off during cutting.

Column 1 row 5 of table 115 FIG. 3 is a parameter identification box 127 labeled Focal Position (inches). The label 127 changes to Focal Position (mm) when the Units parameter 111 is Metric. The Focal Position parameters associated with pierce steps T0 through T8 set the position of the focal spot 51 FIG. 1, relative to the upper surface 32 of the workpiece 27, for that pierce step. A value 0.000 coincides with the upper surface of the workpiece. Positive values position the focal spot above the surface of the workpiece. Negative values position the focal spot below the upper surface of the workpiece. A Focal Position parameter 128 is associated with Cut parameters 120. The focal position parameter 128 sets the focal position for cutting the workpiece.

Column 1 row 6 of table 115 FIG. 3 is a parameter identification box 129 labeled Peak Power (watts). The power is measured in watts in both inch and metric modes. The Peak Power parameters associated with pierce steps T0 through T8 sets the maximum laser power for that pierce step. A Peak Power parameter 130 associated with Cut parameters 120 sets the maximum laser power for cutting the workpiece.

Column 1 row 7 of table 115 is a parameter identification box 131 labeled Mode. The mode parameters associated with pierce steps T0 through T8 set the operating mode of the laser, the character of the laser beam used to pierce the hole. Clicking on a mode parameter box with a computer input device, such as a mouse, toggles the mode through selections CW, Pulse, Super, and Hyper. CW indicates a continuous wave laser beam. Pulse indicates a pulsed or gated pulsed laser beam. Super indicates a superpulsed laser beam. Hyper indicates a hyperpulsed laser beam. A Mode parameter 132 associated with Cut parameters 120 sets the mode of the laser beam for cutting the workpiece.

Figure 6A:
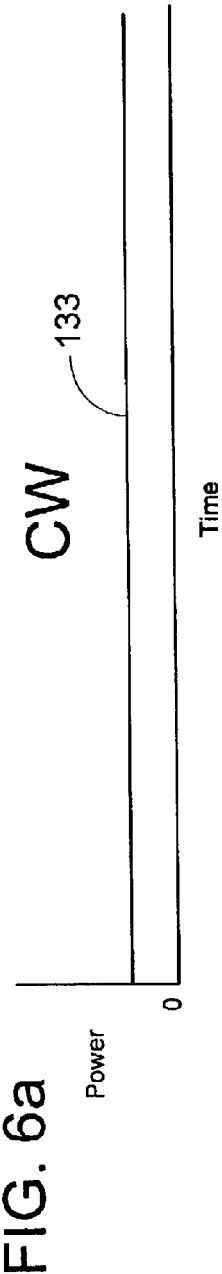
FIGS. 6a, 6b 6c and 6d illustrate laser-operating modes CW, Pulse, Super, and Hyper respectively.

FIG. 6A illustrates a CW laser beam 133. The CW laser beam 133 has a constant power level over time. The power level of the CW beam is controllable by the Peak Power parameters 129 of table 115 FIG. 3.

Figure 6B:
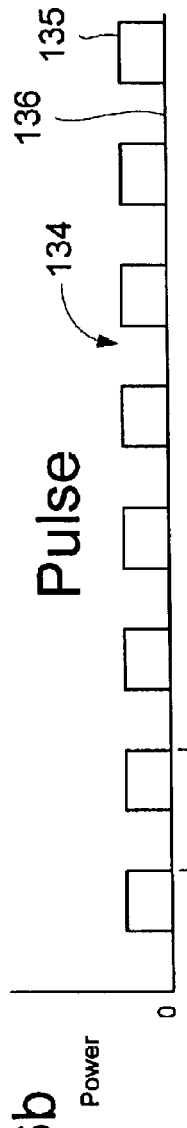

FIG. 6B illustrates a Pulse laser beam 134. The pulsed laser beam 134 alternates between a power level 135 and off 136 at a fixed frequency, cycles per second. The power level 134 is set by the Peak Power parameters 129 of table 115 FIG. 3 for the pierce cycle and by parameter 130 for the cut. The frequency of the pulsed beam 134 is set by Frequency parameters 147 of table 115 FIG. 3 for the pierce cycle and by parameter 148 for the cut. The portion of a cycle 137 that the pulsed laser beam 134 is at power is set by Duty Cycle parameters 149 of table 115 FIG. 3 for the pierce cycle and by parameter 150 for the cut. The duty cycle illustrated in FIG. 6B is 50 percent.

Figure 6C:
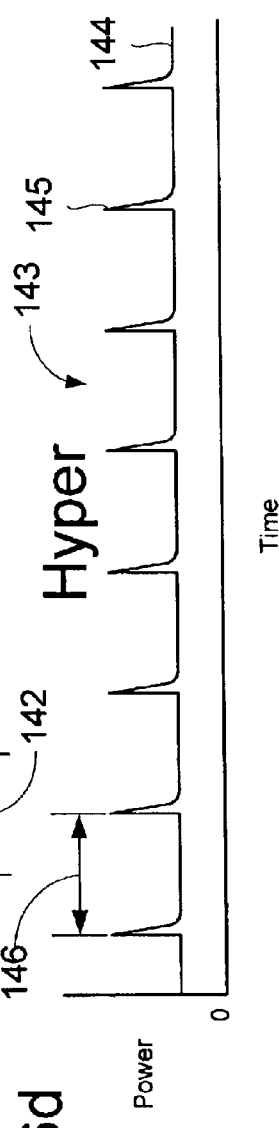

FIG. 6C illustrates a Super laser beam 138. The superpulsed laser beam 138 alternates between a power level 139 and off 140 at a fixed frequency, cycles per second. The power level 139 of the superpulsed beam is set by the Peak Power parameters 129 of table 115 FIG. 3 for the pierce cycle and by parameter 130 for the cut. The superpulsed laser beam has a power spike 141 at the leading edge of every on period. The power level of the spike is approximately 230 percent of the power level 139. The frequency of the superpulsed pulsed beam 138 is set by Frequency parameters 147 of table 115 FIG. 3 for the pierce cycle and by parameter 148 for the cut. The portion of a cycle 142 that the superpulsed beam 138 is at or above power is set by Duty Cycle parameters 149 of table 115 FIG. 3 for the pierce cycle and by parameter 150 for the cut. The duty cycle illustrated in FIG. 6C is 50 percent.

Figure 6D:
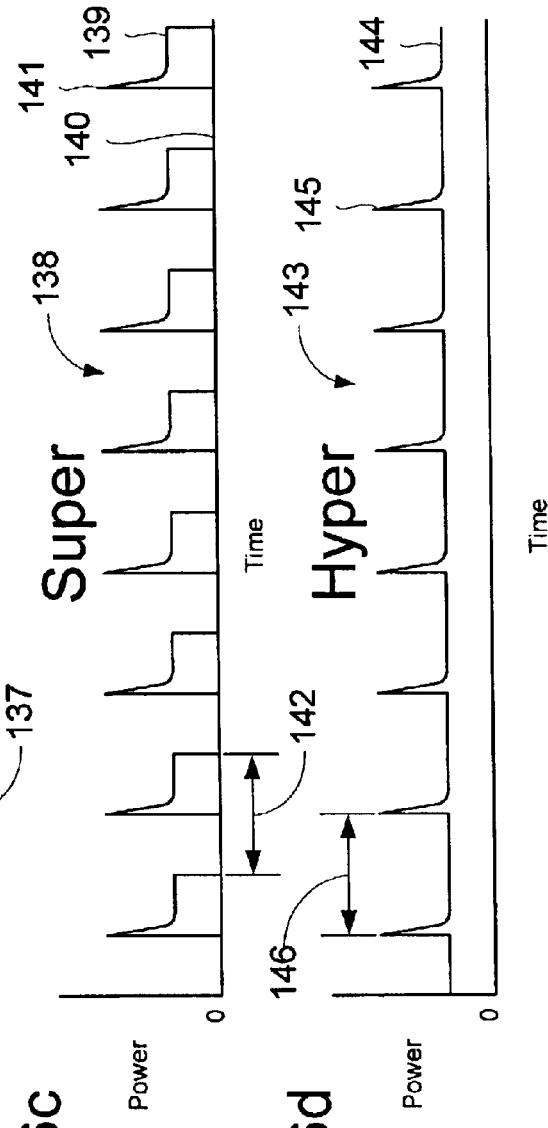

FIG. 6D illustrates a Hyper laser beam 144. The hyperpulsed laser beam is a continuous wave laser beam with a superimposed power spike 145. The power spike 145 occurs at a frequency 146 that is set by Frequency parameters 147 of table 115 FIG. 3 for the pierce cycle and by parameter 148 for the cut. The power level of the spike is approximately 230 percent of the power level 144. The power level 144 of the hyperpulsed beam is set by the Peak Power parameters 129 of table 115 FIG. 3 for the pierce cycle and by parameter 130 for the cut.

Column 1 row 8 of table 115 FIG. 3 is a parameter identification box 147 labeled Frequency (hz). The Frequency parameters associated with pierce steps T0 through T8 set the frequency of a Pulse, Super, or Hyper beam for that step for piercing a hole. A frequency parameter 148 associated with the Cut parameters 120 sets the frequency of the beam for cutting the workpiece.

Column 1 row 9 of table 115 is a parameter identification box 149 labeled Duty Cycle (%). The Duty Cycle parameters associated with pierce steps T0 through T8 set the duty cycle of a pulsed, superpulsed, or hyperpulsed beam for that step for piercing a hole. A Duty Cycle parameter 150 associated with the Cut parameters 120 sets the duty cycle of a pulsed, superpulsed, or hyperpulsed laser beam for cutting the workpiece.

Column 1 row 10 of table 115 is a parameter identification box 151 labeled Assist Gas Type. The Assist Gas Type parameters associated with pierce steps T0 through T8 set the type of assist gas for piercing a hole. In the preferred embodiment clicking on any pierce assist gas type parameter box with a computer input device, such as a mouse, toggles all pierce assist gas parameters through selections Air, O2 (oxygen), and N2 (nitrogen). Toggling all pierce assist gas type parameters at once is practical because it typically is not practical to change assist gas types during the pierce cycle. An Assist Gas Type parameter 152 associated with the Cut parameters 120 sets the assist gas type for cutting the workpiece. Clicking on the parameter 152 with a computer input device, such as a mouse, toggles the parameter 152 through selections Air, O2 (oxygen), and N2 (nitrogen).

Column 1 row 11 of table 115 is a parameter identification box 153 labeled Assist Gas Pressure (psi). The label 153 changes to Assist Gas Pressure (bar) when the Units parameter 111 is Metric. The Assist Gas Pressure parameters associated with pierce steps T0 through T8 set the pressure of the assist gas for that step of the pierce cycle. The Assist Gas Pressure parameters associated with pierce steps T0 through T8 can all be the same, can all be different, or be any combination thereof. An Assist Gas Pressure parameter 154 associated with the Cut parameters 120 sets the pressure of the assist gas for cutting the workpiece.

Column 1 row 12 of table 115 is a parameter identification box 155 labeled Standoff (inches). The label 155 changes to Standoff (mm) when the Units parameter 111 is Metric. The Standoff parameters associated with pierce steps T0 through T8 set the standoff distance 61 FIG. 1 for that step of the pierce cycle. The Standoff parameters associated with pierce steps T0 through T8 can all be the same, can all be different, or can be any combination thereof. A Standoff parameter 156 associated with the Cut parameters 120 sets the standoff distance for cutting the workpiece.

Below table 115 FIG. 3 is a parameter labeled Aux Side Jet Pressure 157. In a preferred embodiment of the invention, the parameter Aux Side Jet Pressure 157 is a reference advising the pressure setting of a gas regulator 158 FIG. 1 on an auxiliary gas supply 159. The Aux Side Jet Pressure parameter 157 and the auxiliary gas jet apparatus 76 are adaptable such that parameter 157 sets the delivery pressure of the auxiliary side jet gas.

Below parameter 157 FIG. 3 is a parameter labeled Aux Side Gas Type 110. In a preferred embodiment of the invention the parameter Aux Gas Type 110 is a reference advising the type of gas the supply 159 FIG. 1 provides. In an alternate embodiment the auxiliary gas jet apparatus 76 is adapted similar to the assist gas apparatus 66 and in that embodiment parameter 110 determines the type of auxiliary gas delivered.

Below table 115 FIG. 3 is a parameter labeled Anti-Spatter 158 that is associated with the anti-spatter apparatus 72 FIG. 1. The anti-spatter apparatus 72 delivers a controlled amount of anti-spatter agent 73 to the workpiece 27 per anti-spatter apparatus cycle. The parameter 158 sets the number of anti-spatter delivery cycles. If parameter 158 is set at "0", no anti-spatter agent is delivered. If the parameter 158 is set to a number greater than "0", that number of cycles is delivered to the workpiece before piercing step T1 is executed.

Below the Anti-Spatter parameter 158 is a parameter labeled Z Axis Hold Distance (from pierce) 159. The Z Axis Hold Distance parameter 159 is displayed in inches when Units 111 is inch or in millimeters, mm, when Units 111 is metric. It is a feature of the invention, in transitioning from a pierce to a cut, that the axis controlling the position of the cutting nozzle relative to the surface of the workpiece can be held in position for a selectable distance into the cut. The vertical position can be temporarily held to prevent a nozzle position control system, 63 FIG. 1, from reacting to any piercing residue around the top of the pierced hole. The Z Axis Hold Distance parameter 159 sets the hold distance. Upon cutting the Z-axis hold distance, the standoff distance, 61 FIG. 1, is changed to that indicated by cut parameter 156 and maintained at that distance for the remainder of the cut, unless altered by other cut parameters.

It is a feature of the invention that changes in the Focal Position 127 FIG. 3, Peak Power 129, Frequency 147, Duty Cycle 149 Assist Gas Pressure 153 and Standoff 155 parameters associated with piercing steps T1–T8 119 are linearly interpolated across the Time Increment 121 of the respective step. For example, refer to FIG. 7, a graph of the focal position, as controlled by parameters 127 FIG. 3, linearly interpolated across Time Increment steps T1–T7. Recall that the Focal Position parameters associated with pierce steps T0 through T8 specify the position of the focal spot 51 FIG. 1 relative to the upper surface 32 of the workpiece 27. A value 0.000 coincides with the upper surface of the workpiece. Positive values position the focal spot above the surface of the workpiece. Negative values position the focal spot below the upper surface of the workpiece.

Figure 7:
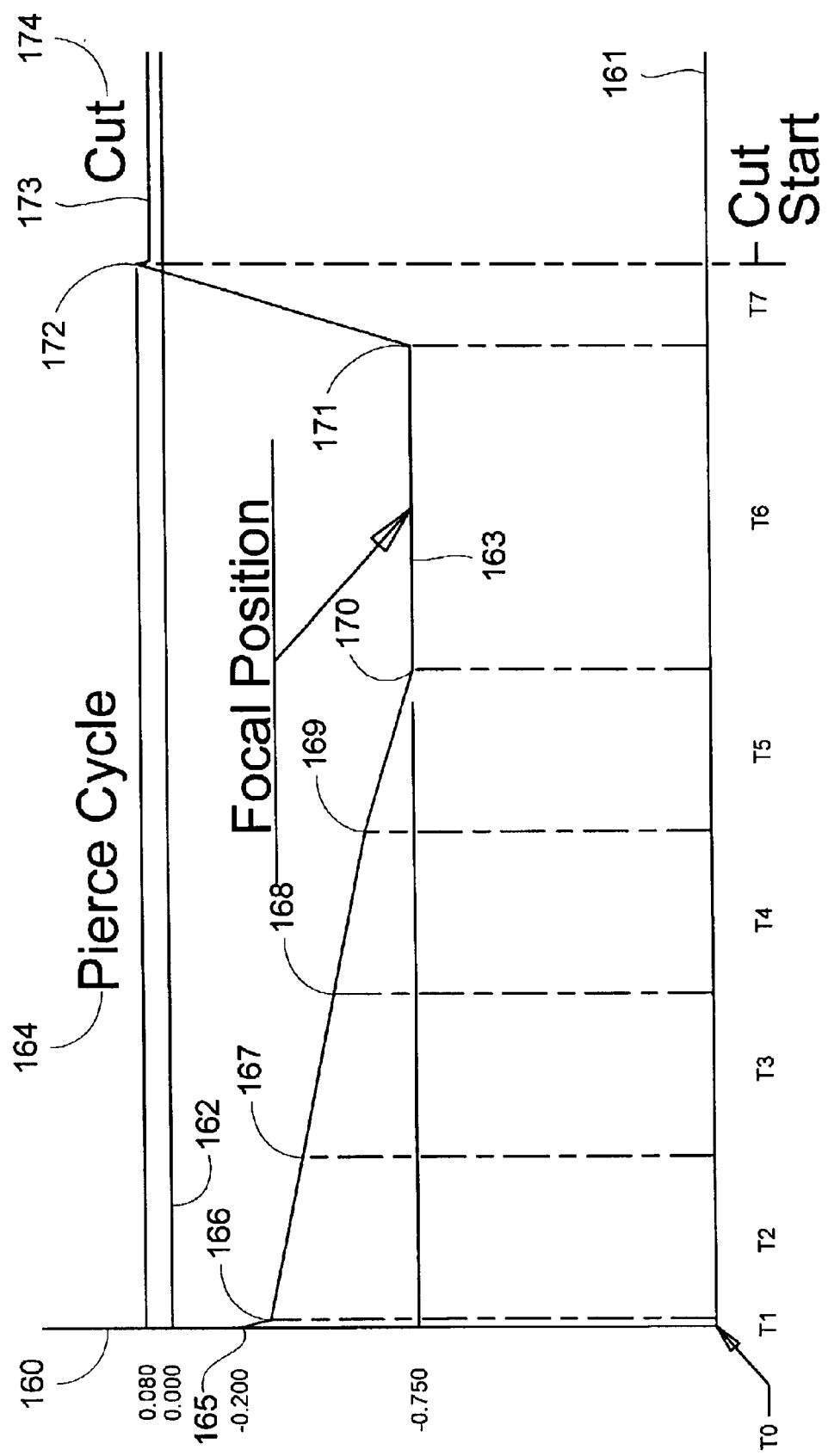
FIG. 7 is a graph of the focal position, as controlled by parameters 126 FIG. 3, linearly interpolated across Time Increment steps T1–T7.

The active Focal Position parameters of FIG. 3 are T0=−0.200 (this is the setup parameter), T1=−0.300, T2=−0.400, T3=−0.500, T4=−0.600, T5=−0.750, T6=−0.750, T7=0.080, and Cut=0.040. The active Time Increment parameters 121 FIG. 3 are T0=0, T1=0.050 sec, T2=1.000 sec, T3=1.000 sec, T4=1.000 sec, T5=1.000 sec, T6=2.000 sec, and T7=0.500 sec. Referring to FIG. 7, the vertical axis 160 represents the focal position, the horizontal axis 161 represents time, a thin line 162 at 0.000 represents the upper surface of the workpiece and a line 163 traces the focal position across time. The pierce cycle 164 starts at T0 with the focal position at −0.200 165, then moves linearly across T1 to −0.300 166, then moves linearly across T2 to −0.400 167, then moves linearly across T3 to −0.500 168, then moves linearly across T4 to −0.600 169, then moves linearly across T5 to −0.750 170, then remains at −0.750 across T6 to 171, then moves linearly across T7 to 0.080 172, and then quickly moves to 0.040 173 for the cut 174.

Figure 8:
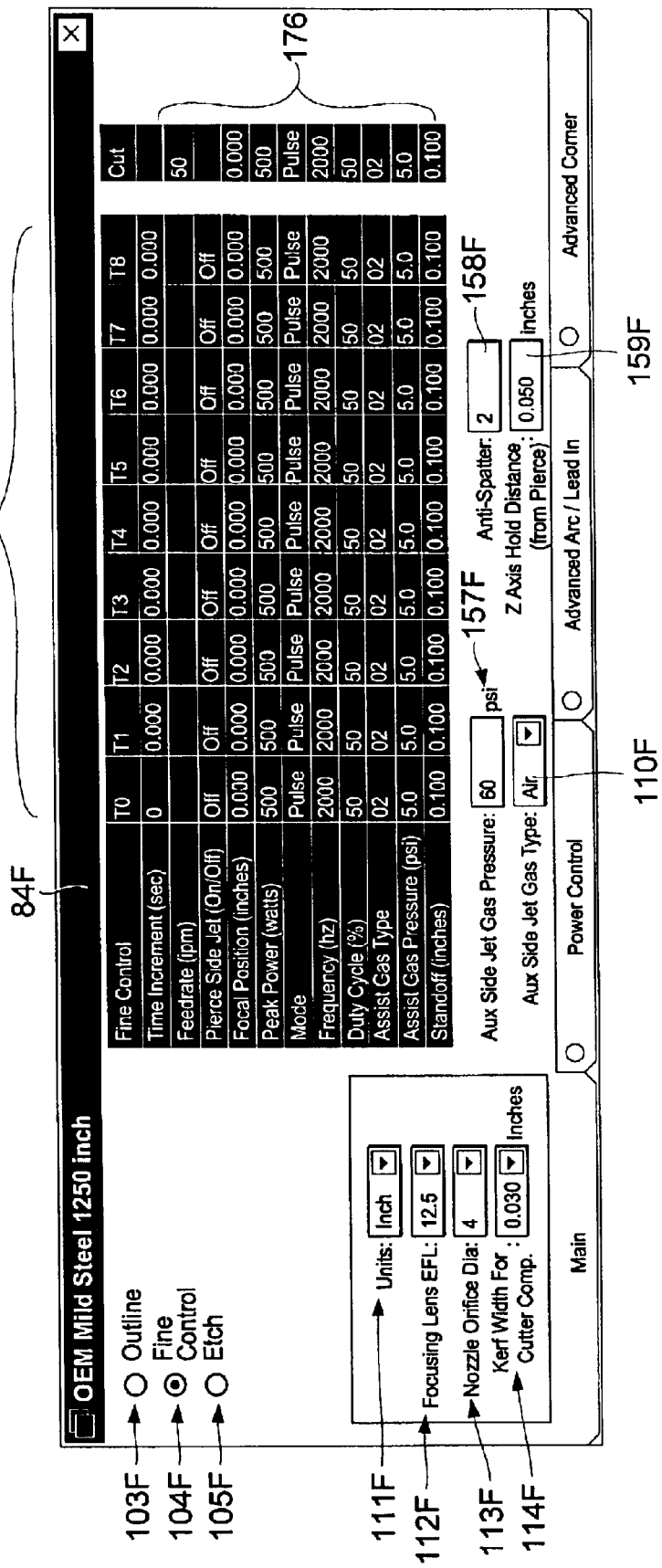
FIG. 8 is an illustration of a MPL file Fine Control screen.

FIG. 8 illustrates a Fine Control screen 84F of the MPL file 84 FIG. 3. The Fine Control screen 84F is displayed by clicking on the Fine Control option button 104 FIG. 3, 104F FIG. 8, or 104E FIG. 9 with a computer input device such as a mouse and is associated with control parameters suitable for cutting smaller or finer features of geometry. The Fine Control screen 84F is illustrated with default parameters in piercing parameter fields 175 and Cut parameter fields 176. The parameter fields of FIG. 8 function as described in connection with FIG. 3.

Figure 9:
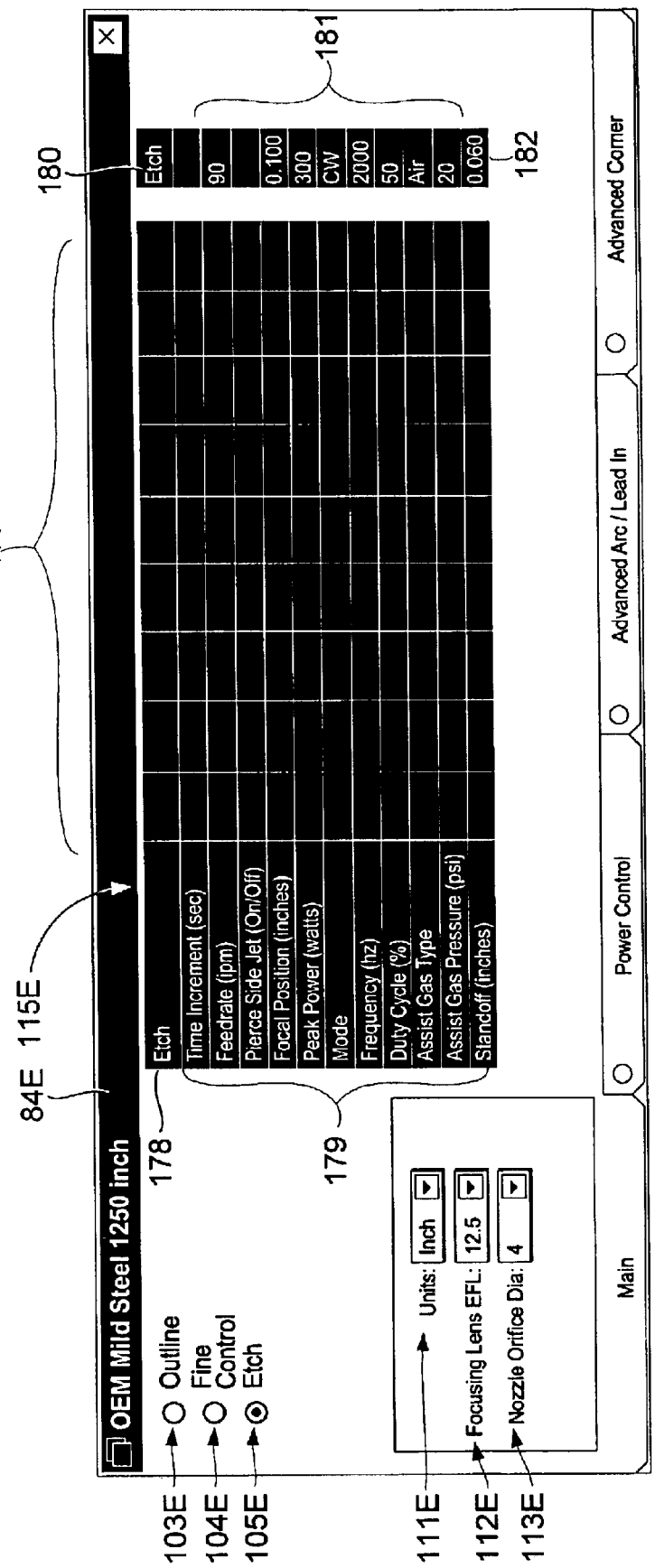
FIG. 9 is an illustration of a MPL file Etch screen.

FIG. 9 illustrates an Etch control screen 84E of the MPL file 84 FIG. 3. The Etch screen 84E is displayed by clicking on the Etch option button 105 FIG. 3, 105F FIG. 8, or 105E FIG. 9 with a computer input device such as a mouse and is associated with parameters suitable for laser etching a character, mark, or feature of geometry into a part. The Etch control screen 84E is arranged the same as the Outline control screen 84 FIG. 3 and Fine Control screen 84F FIG. 8 with exceptions. A table 115E comprised of 10 columns and 12 rows is like the table 115 FIG. 3 except that the pierce parameter fields 177 are blank. The pierce parameter fields 177 are blank because it is not necessary to pierce a workpiece to etch it. Row 1 column 1 of the table 115E is a header box 178. The header box 178 contains the text of the selected operating mode, Etch. The parameter rows 179 below header box 178 are labeled the same as the parameter rows of the Outline screen 84 FIG. 3 and Fine Control screen 84F FIG. 8. To the right of the table 115E is a single column of parameters labeled Etch 180. The Etch parameters 181 control the etching process. The Etch parameters 181 function as previously described in connection with FIG. 3.

The column of Etch parameters 180 is adapted with an embedded cycle; Find Plate Etch, for finding the upper surface 32 of the workpiece 27. When the cutting head 26 is moved from one etch position to another etch position it may be carried at a retracted position well above the workpiece. Upon reaching the etch position the Find Plate Etch cycle is initiated and functions as follows. The Z-axis motor 29 FIG. 1 lowers the cutting head with the capacitive sensor 63 active, senses the workpiece and positions the cutting nozzle to a standoff position 61 that is determined by the standoff parameter 182 FIG. 9. Upon reaching the standoff position and setting the other associated parameters at indicated values, etching proceeds.

Figure 10:
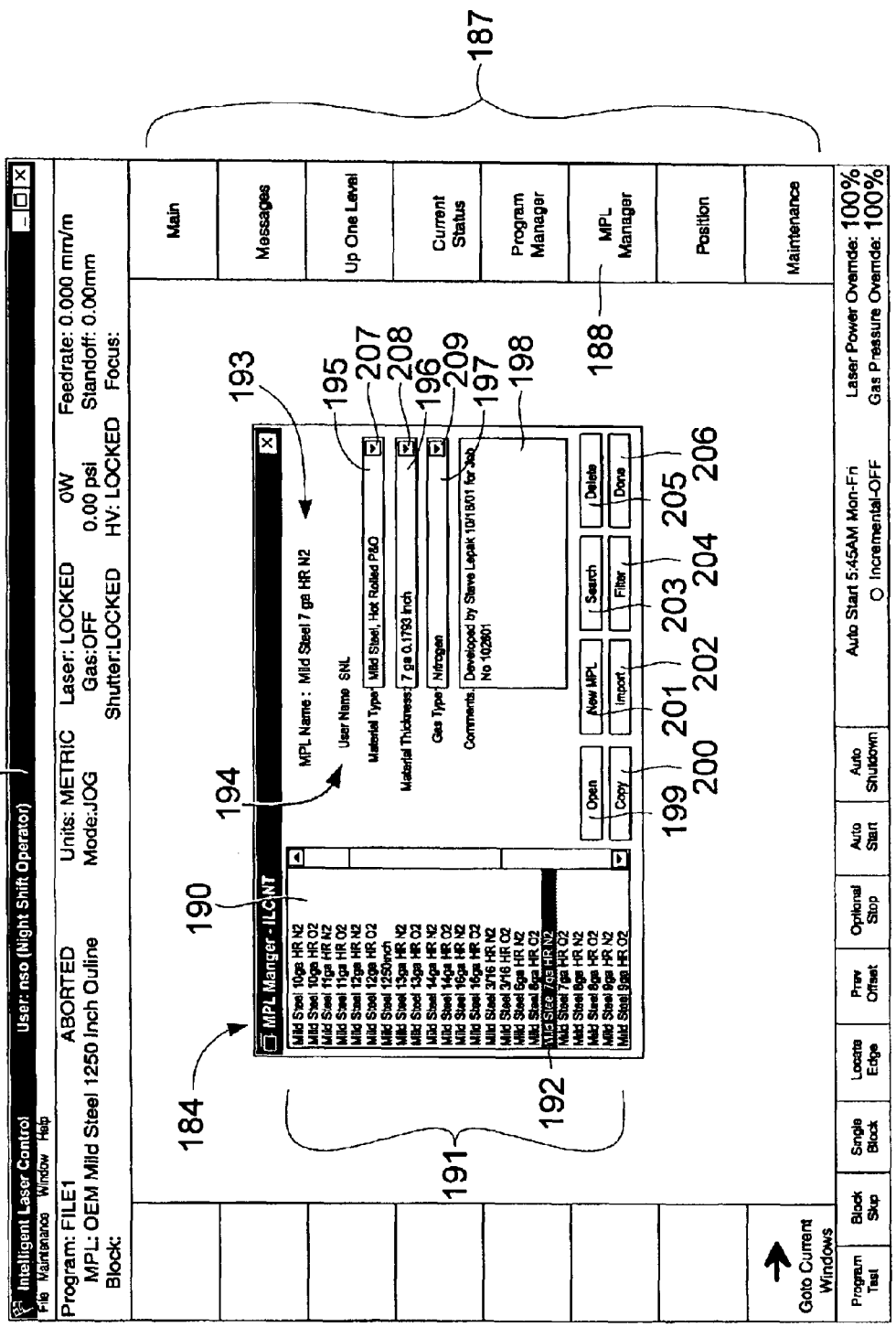
FIG. 10 is an illustration of a visual display screen showing the MPL Manager.

The MPL file 84 FIG. 3, is associated with a MPL Manager 184 FIG. 10. FIG. 10 is an illustration of a visual display screen 183 showing the MPL Manager 184. Clicking on a Main soft key 185 FIG. 2 with a computer input device such as a mouse, or selecting the Main soft key 185 by pressing an associated push button 186 FIG. 1 causes the soft key menu 86 FIG. 2 to change to that shown at 187 FIG. 10. Then clicking on a MPL Manager soft key 188 FIG. 10 or selecting the MPL Manager soft key 188 by pressing on an associated push button 189 FIG. 1 causes the MPL Manager 184 FIG. 10 to be displayed.

The MPL Manager 184 provides controls to import, find, copy, create and delete MPL files. The MPL Manager has a display area 190 for displaying a plurality of MPL names 191. Clicking on a MPL name with a computer input device selects and causes that MPL name to be highlighted 192. The selected MPL name 192 is displayed in a MPL Name field 193. The name or initials of the creator of the selected MPL name 192 is displayed in a User Name field 194. Additional attributes of the selected MPL name are displayed in a Material Type text box 195, a Material Thickness text box 196, a Gas Type text box 197 and a Comments text box 198.

A plurality of command buttons labeled Open 199 FIG. 10, Copy 200, New MPL 201, Import 202, Search 203, Filter 204, Delete 205 and Done 206 provide controls to accomplish various actions. Clicking on one of the command buttons with a computer input device causes that action to be performed. The Open command button 199 opens or displays the selected MPL file in the central display window area 90 FIG. 2. The Copy command button 200 copies the selected file to start the creation of new MPL file. The NEW MPL command button 201 creates a new MPL file having default parameter data. The Import command button 202 imports an MPL file from a floppy disc, other file storage device or location elsewhere on a network. The Search command button 203 searches for a specific MPL name. The Filter command button 204 searches for files by one or more attributes; MPL Name 193, User Name 194, Material Type 195, Material Thickness 196, Gas Type 197 and Comments 198. The names of the files found in the filter search are displayed in the display area 191. The Delete command button 205 deletes a selected MPL file. The Done command 206 closes the MPL Manager.

A plurality of combo boxes 207 FIG. 10, 208 and 209 are associated with the Material Type text box 195, the Material Thickness text box 197 and the Gas Type text box 197 respectively, and provide selections to quickly change those attributes of a copied MPL file. Alternatively, attribute descriptions may be entered by selecting a text box with a computer input device such as a mouse, then typing in the text box.

The invention is adaptable to having more or fewer parameters and/or auxiliary devices associated with the pierce cycle. For example, FIG. 11 is an illustration of a MPL file display 210 the same as FIG. 3 except having two additional rows of parameters. Column 1 row 13 of pierce table 211 is a parameter identification box Ramp/Step 212. Row 2 columns 3 through 10 associated with steps T1 through T8 118' respectively store either a Step 213 or Ramp 214 parameter for each pierce step. The Step 213 and Ramp 214 parameters determine how changes in a plurality of parameters, Focal Position 127', Peak Power 129', Frequency 147', Duty Cycle 149', Assist Gas Pressure 153' and Standoff 155' associated with piercing steps T1–T8 118' are processed. A Step parameter causes the parameter change to be initiated at the beginning the Time Increment 121' of the associated step. A Ramp parameter causes the parameter change to be linearly interpolated across the Time Increment of the respective step. Parameter box 216 associated with a column of Cut parameters 215 is blank because the Ramp/Step function is not active during the cut.

Figure 12:
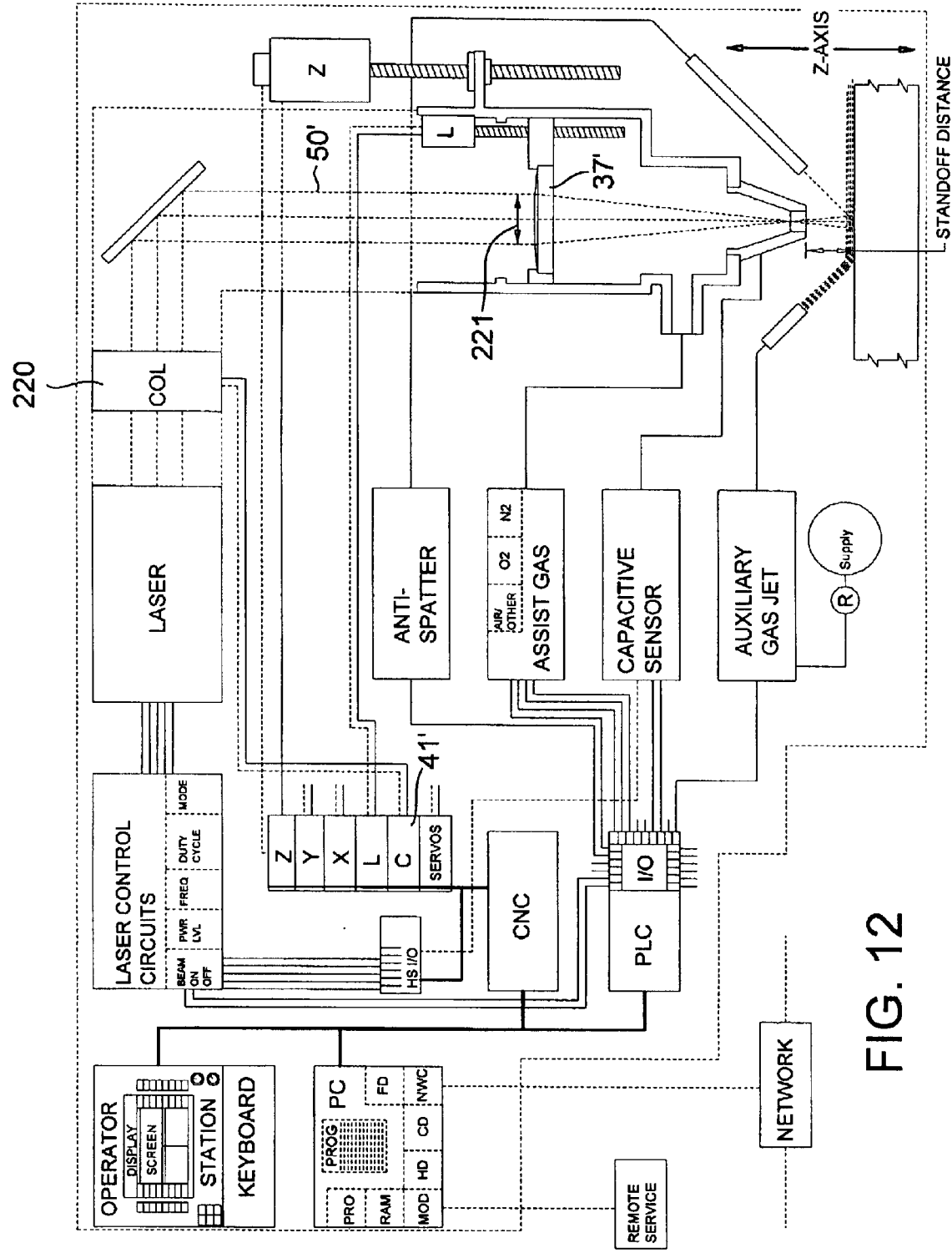
FIG. 12 is the same as FIG. 1 with the addition of a servo driven collimator and showing a smaller diameter laser beam impinging on the focal optic.

Column 1 row 14 of pierce table 211 FIG. 11 is a parameter identification box Beam Size On Focal Optic 217. Row 2 columns 3 through 10 associated with steps T1 through T8 118' respectively contain a parameter S 218 for small, M 219 for Medium, or L (not shown) for Large that is a control input for a servo controlled collimator 220 FIG. 12 setting a diameter 221 of a laser beam 50' impinging on a focal optic 37'. The collimator 220 is driven via a servo drive 41'. FIG. 12 is the same as FIG. 1 with the addition of the servo driven collimator and showing a smaller diameter laser beam impinging on the focal optic. The parameters S 218, M 219 and L for Beam Size on Focal Optic are given by example and not by limitation. The Beam Size On Focal Optic parameters allow the size of the laser beam on the focal optic to be optimized for the type and thickness of material processed.

Figure 13:
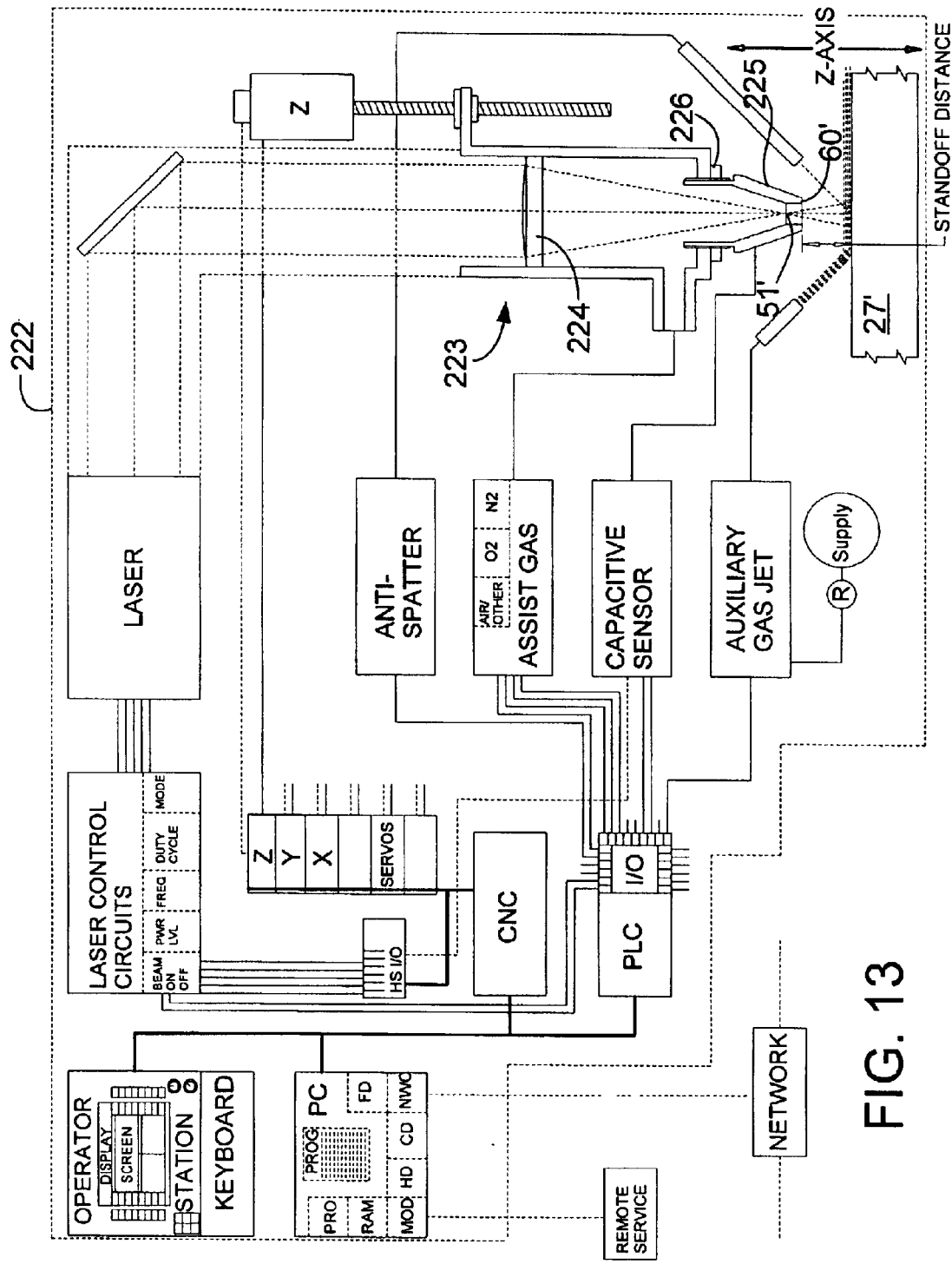
FIG. 13 is an illustration of features of an alternate embodiment of a laser-equipped machine tool that are controllable by the invention.

FIG. 13 is an illustration of features of an alternate embodiment of a laser-equipped machine tool 222 that are controllable by the invention. The machine tool 222 is the same as machine tool 1 FIG. 1 except that it has a cutting head 223 that is adapted with a fixed focal lens 224 and a adjustable nozzle 225 fixed by a nut 226. The nozzle 225 is fixed relative to the focal lens 224 when piercing. The machine tool 222 does not have a lens driving apparatus thus does not require an "L" servo drive. The nozzle 225 is adjusted to correctly position the focal spot 51' relative to the lower face 60' of the nozzle and is then locked in position by the nut 226 before processing the workpiece 27'. The remaining features of FIG. 13 are the same and function the same as in FIG. 1 thus shall not be further described.

Figure 16:
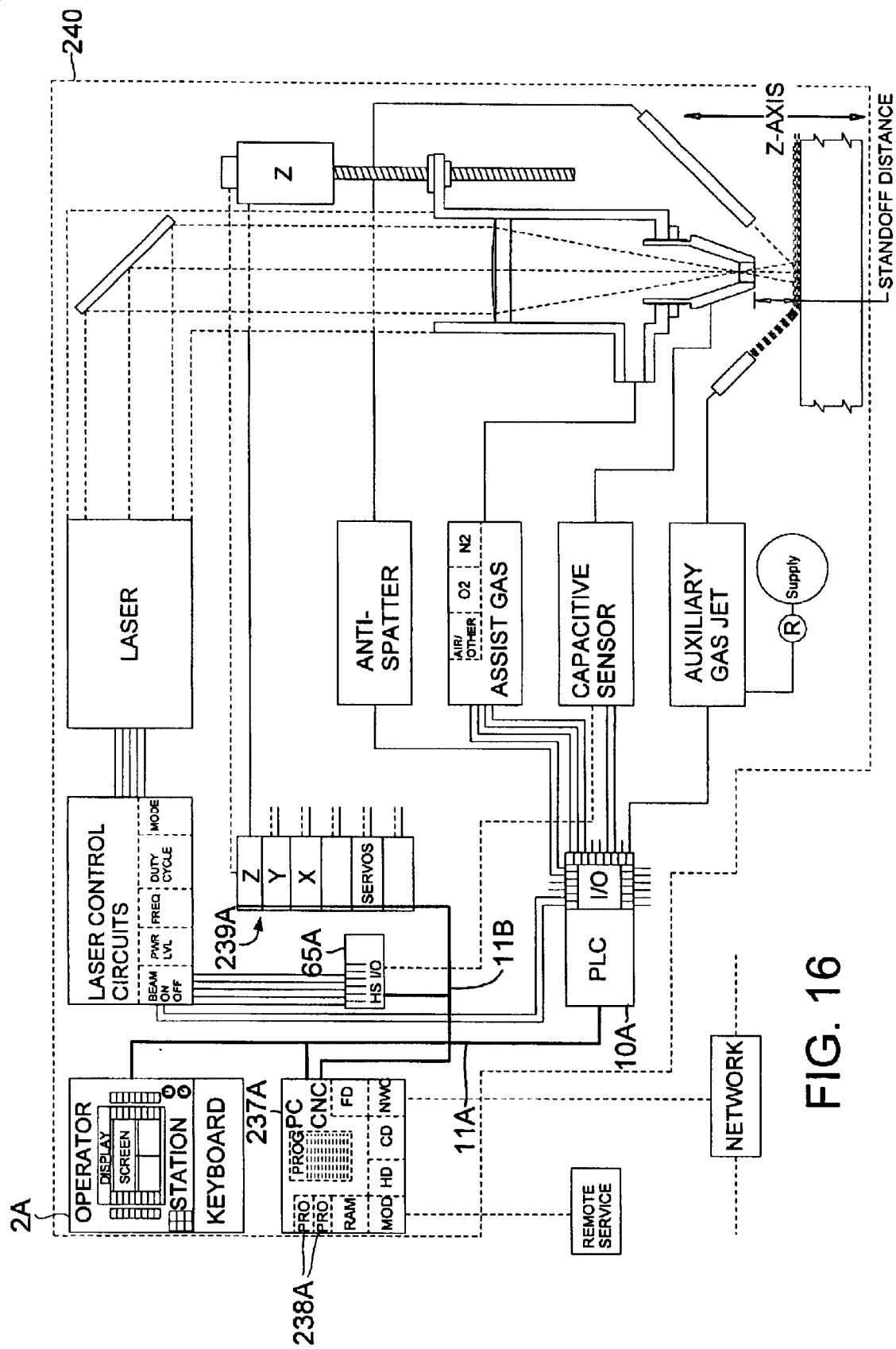
FIG. 16 is the same as FIG. 13 except the CNC is a PC CNC.

FIG. 14 is an illustration of the invention as an MPL file 227 adapted to control the machine tool features of FIGS. 13 and 16. The parameter descriptions of the MPL file 227 are the same and function the same as the parameters of FIG. 1 except as noted. The MPL file 227 has five piercing steps active, T0–T4. The MPL file has an Outline option button 228, a Fine Control option button 229 and an Etch option button 230 for selection of operating mode and a tab Main 231 that is not associated with other control pages. Piercing table 232 has a row of Focal Position parameters 233. The background color of the Focal Position parameters 233 indicates they are inactive because the cutting head 223 FIG. 13 does not have a driven lens. A Focal Position parameter box 234 associated with the T0 pierce step 235 serves only as a reference to the machine operator indicating how to position the focal spot 51' FIG. 13 relative to the lower face 60' of the nozzle 225. It is arbitrary that the parameter box 234 has other than default parameter 0.000.

Figure 15:
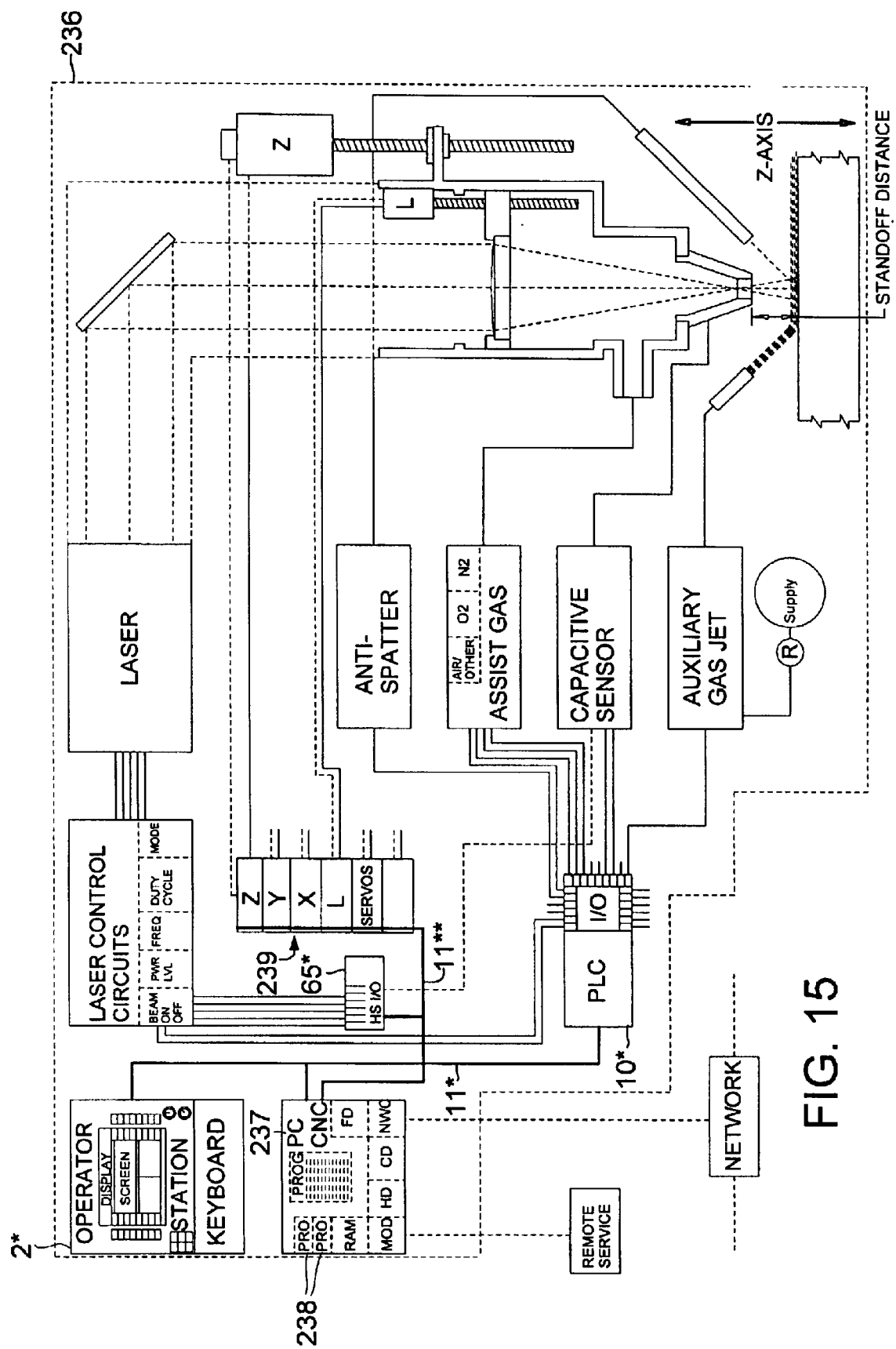
FIG. 15 is the same as FIG. 1 except that the CNC is a PC CNC.

FIG. 15 illustrates features of an alternate embodiment of a laser-equipped CNC machine tool 236 that are controllable by the invention. FIG. 15 is the same as FIG. 1 except the machine tool 236 is adapted with a PC CNC 237. The PC CNC 237 is adapted with a plurality of processors 238 to handle the increased processing load. The PC CNC 237 communicates with a operator station 2* and a PLC 10*, by means of a communication bus 11*. The PC CNC 237 also communicates with High Speed Input/Output modules 65* and a plurality of servo drives 239 via communication bus 11**. Otherwise FIG. 15 is the same as FIG. 1 and is controllable by the invention as described in conjunction with FIGS. 2 through 10.

FIG. 16 illustrates features of an alternate embodiment of a laser-equipped CNC machine tool 240 that are controllable by the invention. FIG. 16 is the same as FIG. 13 except the machine tool 240 is adapted with a PC CNC 237A. The PC CNC 237A is adapted with a plurality of processors 238A to handle the increased processing load. The PC CNC 237A communicates with a operator station 2A and a PLC 10A, by means of a communication bus 11A. The PC CNC 237A also communicates with High Speed Input/Output modules 65A and a plurality of servo drives 239A via communication bus 11B. Otherwise FIG. 16 is the same as FIG. 13 and is controllable by the invention as described in conjunction with FIGS. 13 and 14.

Armed with foregoing description, those skilled in the art will now readily appreciate the method aspects of the invention. A CNC or other related processor is provided with a Material Parameter Library, and individual files within the library are configured with sets of parameters for performing piercing, cutting, and etching operations on different types of material. Considering one record, for example, that record will have a sequence of sets of parameters for controlling a piercing operation for a particular type of material. The parameters are selected from the group consisting of focal position, peak laser power, laser mode, laser frequency, laser pulse duty cycle, assist gas type, assist gas pressure parameters, pierce side jet on/off and stand/off distance. For each record one or more of the parameters in a given set will differ from the corresponding parameters in the previous or subsequent set, so that the result of executing all the sets in sequence for the associated step time results in an optimized pierce cycle for the particular type of material. A step time increment is associated with set of the parameters. When the record is used in operation, the sets of parameters are executed in sequence and for the indicated step time. The machine tool responds by following the parameters during the defined times to control the pierce operation according to the optimized set of parameters.

In practicing the method it is possible to alter the pierce cycle by altering the, parameters, or also by simply deactivating one or more of the steps by assigning a zero time increment to that set of parameters. Thus, the machine tool has available to its computer system an optimized set of parameters for piercing many different types of materials, and the computer system also has the adaptability to allow altering the cycle, as needed, for particular or unique circumstances. When the computer system preprocesses a part program, it accesses a particular MPL record(s), retrieves the information stored therein, prepares control files, and inserts "behind the scene" commands into the part program. When the computer system executes the program, it operates as a controller processing the workpiece according to the selected MPL record(s).

FIGS. 17a–17d are a composite enlarged photograph 240 of the top 241, side 242, bottom 243 and end 244 of a sample part processed by the invention. The sample is designed to illustrate the capability of the invention to control the piercing process thereby minimizing residual heat build up in the part. The carbon steel sample is 0.290 inches wide by 4.620 inches long by 0.75 inch thick and contains nine pierced holes 245 spaced 0.492 inches apart. The sample is produced piercing the nine holes in rapid succession then immediately cutting the part from the plate. Each hole is pierced in less than 2.0 seconds and such that little residual heat is left in the plate. Immediately after piercing one can place a finger on the surface of the pierced hole and not be burned. The shape and size of the pierced hole can be changed by changing the pierce parameters.

FIG. 18 is an enlarged photograph of the sample taken along 18—18 FIG. 17d after milling away the surface to expose the pierced holes. The pierced holes are approximately 0.090 inch diameter at the top 246 and bottom 247 of the plate. The smallest diameter of the holes ranges from 0.054 to 0.062 inch.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A controller for laser piercing and cutting metal sheet and plate comprising in combination:

a computer readable file displayable on a human machine interface display screen of a laser equipped CNC machine tool and communicating with a part program for processing a workpiece;

said computer readable file adapted with a plurality of setup data and parameters for piercing and cutting a type and thickness of material and adapted substantially as a table;

said table comprising a plurality of parameters, each parameter controlling a unique function of operation;

said table comprising a plurality of steps comprised of a first setup step and a plurality of time increment steps having individually selectable time durations, each time increment step controlling a portion of a pierce cycle;

said table associated with a plurality of parameters controlling cutting the workpiece; and a computer system to process said part program and control said laser equipped machine tool to perform piercing and cutting according to said computer readable file.

2. The combination of claim 1 wherein the computer readable file is adapted as three display screens, a display screen associated with parameters for cutting larger, coarse features of part geometry, a display screen associated with parameters for cutting small, fine features of part geometry, and a display screen associated with parameters for etching a character, mark or feature of geometry into a workpiece.

3. The combination of claim 2 wherein the display screens are associated with at least one other control means adapted substantially as a table and controlling another aspect of cutting a workpiece.

4. The combination of claim 2 wherein the display screen associated with parameters for cutting larger, coarse features of part geometry and the display screen associated with parameters for cutting smaller, fine features of part geometry and the display screen associated with parameters for etching a character, mark or feature of geometry into a workpiece are each callable from the part program.

5. The combination of claim 2 wherein the pierce cycle associated with the display screen associated with parameters for cutting larger, coarse features of part geometry and the pierce cycle associated with the display screen associated with parameters for cutting smaller, fine features of part geometry are each callable from the part program.

6. The combination of claim 1 wherein the table is adapted to selectively engage and disengage at least one auxiliary function associated with the pierce cycle.

7. The combination of claim 1 wherein the table is associated with other parameter and text fields on the display screen.

8. The combination of claim 7 wherein the other parameter and text fields are comprised of parameters and fields from the group consisting of units of measurement, lens focal length, nozzle orifice diameter, kerf width for cutter compensation, auxiliary side jet gas type, auxiliary side jet gas pressure, anti-spatter cycles, and Z-axis hold distance from pierce.

9. The combination of claim 8 wherein the lens focal length parameter is associated with an automatic lens changer apparatus.

10. The combination of claim 8 wherein the lens focal length parameter is associated with an automatic cutting head changer apparatus.

11. The combination of claim 8 wherein the nozzle orifice diameter parameter is associated with an automatic nozzle changer apparatus.

12. The combination of claim 1 wherein not all of the plurality of time increment steps need be selected to pierce a workpiece.

13. The combination of claim 1 wherein the table is comprised of parameters from the group consisting of step time increment, cut feedrate, pierce side jet on/off, focal position, peak laser power, laser mode, laser frequency, laser pulse duty cycle, assist gas type, assist gas pressure and standoff distance.

14. The combination of claim 10 wherein the table has at least one parameter comprising a control input to a servo driven collimator for setting the laser beam diameter impinging on a focal optic in a cutting head.

15. The combination of claim 1 wherein the computer readable file is associated with a file manager, said file manager having one or more controls to open, copy, create new, import, search, filter and delete Material Parameter Library (MPL) files, said MPL files having parameters for said computer readable file to perform at least one of piercing, cutting and etching a specific type, alloy and thickness of material, said file manager having a display area for displaying at least one of a plurality of MPL names, a Name field for displaying a MPL file name, a User Name field for displaying at least one of the name and initials of the creator of the MPL file, a Material Type text box for displaying the type of material to be processed, a Material Thickness text box to display the thickness of material to be processed, a Gas Type text box to display the type of gas to be used to cut the material, and a Comments text box to display comments about the MPL.

16. The combination of claim 1 wherein the computer readable file resides on a computer communicating with the CNC of the laser equipped machine tool.

17. The combination of claim 1 wherein the computer readable file resides on the CNC of the laser equipped machine tool.

18. The combination of claim 1 wherein the computer readable file is adapted as an original equipment manufacturer file such that the manufacturer of the laser equipped machine tool controls its parameter settings.

19. The combination of claim 1 wherein the computer readable file is adapted as a user file such that a user of the laser equipped machine tool controls its parameter settings.

20. The combination of claim 1 wherein at least some of the changes in a parameter setting associated with a time increment step, are activated by linearly ramping the change across the time increment of the step.

21. The combination of claim 1 wherein at least some of the changes in a parameter setting associated with a time increment step, are selectively activated at the beginning of the step time period or by linearly ramping the change across the time increment of the step.

22. The combination of claim 1 wherein the computer readable file is adapted as three display screens, a display screen associated with parameters for cutting larger, coarse features of part geometry, a display screen associated with parameters for cutting smaller, fine features of part geometry, and a display screen associated with parameters for etching a character, mark or feature of geometry into a workpiece wherein:

the setup step of the display screen for cutting coarse features and the setup step of the display screen for cutting fine features and the etch parameters of the etch display screen have an embedded cycle controlling the finding of the workpiece by the cutting nozzle and establishing an initial standoff height between the nozzle and the workpiece.

23. The combination of claim 22 wherein the display screen associated with parameters for cutting larger, coarse features of part geometry and the display screen associated with parameters for cutting smaller, fine features of part geometry and the display screen associated with parameters for etching a character, mark or feature of geometry into a workpiece are each callable from the part program.

24. The combination of claim 22 wherein the pierce cycle associated with the display screen associated with parameters for cutting larger, coarse features of part geometry and the pierce cycle associated with the display screen associated with parameters for cutting smaller, fine features of part geometry are each callable from the part program.

25. The combination of claim 1 wherein the laser equipped machine tool has a cutting head with a servo driven focal optic for controlling the position of the focal spot relative to the surface of the workpiece.

26. The combination of claim 1 wherein the laser equipped machine tool has a cutting head in which the focal optic is fixed in position relative to the cutting nozzle during operation of the laser.

27. The combination of claim 1 wherein the computer readable file is adapted to communicate with the part program to control the piercing of the workpiece, a transition to cutting the workpiece and the cutting of the workpiece while selectively displayed or not displayed on the human machine interface display screen of the machine tool.

28. The combination of claim 1 wherein the computer readable file is callable from the part program.

29. The combination of claim 1 wherein the pierce cycle is callable from the part program.

30. A controller for laser piercing and cutting metal sheet and plate comprising in combination:

a computer readable file displayable on a human machine interface display screen of a laser equipped CNC machine tool and communicating with a part program for processing a workpiece;

said computer readable file adapted with a plurality of setup data and parameters for piercing and cutting a type and thickness of material and adapted substantially as a table;

said table comprising a plurality of parameters, each parameter controlling a unique function of operation;

said table comprising a plurality of steps comprised of a first setup step and a plurality of time increment steps having individually selectable time durations, each variable time increment step controlling a portion of a pierce cycle;

said table adapted to selectively engage and disengage at least one auxiliary function within the pierce cycle;

said table associated with a plurality of parameters controlling cutting the workpiece; and a computer system to process said part program and control said laser equipped machine tool to perform piercing and cutting according to said computer readable file.

31. A controller for laser piercing and cutting metal sheet and plate comprising in combination:

a computer readable file displayable on a human machine interface display screen of a laser equipped CNC machine tool, residing on a computer associated with the CNC of said machine tool and communicating with a part program for processing a workpiece;

said computer readable file adapted as three display screens, a display screen associated with parameters for cutting larger, coarse features of part geometry, a display screen associated with parameters for cutting small, fine features of part geometry, and a display screen associated with parameters for etching a character, mark or feature of geometry into a workpiece;

said computer readable file adapted with a plurality of setup data and parameters for piercing and cutting a type and thickness of material and adapted substantially as a table;

said table comprising a plurality of parameters, each parameter controlling a unique function of operation;

said table comprising a plurality of steps comprised of a first setup step and a plurality of time increment steps having individually selectable time durations, each time increment step controlling a portion of a pierce cycle;

said table associated with a plurality of parameters controlling cutting the workpiece;

said display screens associated with at least one other control means adapted substantially as a table and controlling another aspect of cutting a workpiece; and a computer system to process said part program and control said laser equipped machine tool to perform piercing and cutting according to said computer readable file.

32. A controller for laser piercing and cutting metal sheet and plate comprising in combination:

a computer readable file displayable on a human machine interface display screen of a laser equipped CNC machine tool, residing on the CNC of said machine tool and communicating with a part program for processing a workpiece;

said computer readable file adapted as three display screens, a display screen associated with parameters for cutting larger, coarse features of part geometry, a display screen associated with parameters for cutting small, fine features of part geometry, and a display screen associated with parameters for etching a character, mark or feature of geometry into a workpiece;

said computer readable file adapted with a plurality of setup data and parameters for piercing and cutting a type and thickness of material and adapted substantially as a table;

said table comprising a plurality of parameters, each parameter controlling a unique function of operation;

said table comprising a plurality of steps comprised of a first setup step and a plurality of time increment steps having individually selectable time durations, each time increment step controlling a portion of a pierce cycle;

said table associated with a plurality of parameters controlling cutting the workpiece;

said display screens associated with at least one other control means adapted substantially as a table and controlling another aspect of cutting a workpiece; and a computer system to process said part program and control said laser equipped machine tool to perform piercing and cutting according to said computer readable file.

33. A method of controlling piercing in a laser equipped machine cool comprising the steps of:

providing a Material Parameter Library which stores at least a plurality of sets of pierce cycle parameters for a plurality of material types;

dividing each pierce cycle into a plurality of sequential increments;

separately specifying the duration of each said increment and the pierce cycle parameters for that increment; and when a pierce cycle is required, operating on information from a selected Material Parameter Library record related to the type of material being processed by sequencing through the sequential increments for the selected time durations and at the selected pierce cycle parameters.

34. The method of claim 33 wherein each pierce cycle also includes a setup increment in which a cutting head executes a "find plate" operation using a plate surface sensor, then transitions focal position control to an alternative feedback mechanism for the duration of the pierce cycle.

35. The method of claim 34 in which the alternative feedback mechanism comprises servo feedback from a motor operating the focal position control.

36. The method of claim 34 further including a transition increment for initiating the cut, and including the step of operating the transition increment under the control of the alternative feedback mechanism.

37. The method of claim 33 wherein the pierce parameters for a pierce cycle are selected from the group consisting of focal position, peak laser power, laser mode, laser frequency, laser pulse duty cycle, assist gas type, assist gas pressure, pierce side jet on/off and stand-off distance.

38. The method of claim 33 further including the step of altering the pierce cycle by assigning a zero time duration to one of the increments thereby deactivating that increment.

39. The method of claim 38 in which assigning a zero time duration to said one increment also deactivates all subsequent increments.

40. The method of claim 33 in which a table is displayed on an operator interface showing the increments, time durations and pierce cycle parameters, and further including the step of user alteration of the parameters or increments for altering the pierce cycle.

41. A method of piercing a workpiece using a computer numerically controlled laser equipped machine tool, the method comprising the steps of:
    subdividing the piercing cycle into a plurality of increments;
    independently selecting a duration for each increment;
    selecting a plurality of laser operating parameters for each of the increments, such that the increments when performed in sequence for the selected durations and at the selected laser operating parameters is capable of piercing the workpiece; and
    operating the piercing cycle by sequencing through the increments for the selected time durations and at the selected laser operating parameters.

42. A controller for laser piercing and cutting metal sheet and plate comprising in combination:
    a memory for storing a piercing cycle table, with the table subdividing the piercing cycle into a plurality of increments;
    an interface by which an operator optionally selects a duration for each increment and a plurality of laser operating parameters for each increment, such that the increments when performed in sequence for the selected durations and at the selected laser operating parameters is capable of piercing the workpiece; and
    the controller being constructed to operate the piercing cycle by sequencing through the increments for the selected rime durations and at the selected laser operating parameters.

43. The controller of claim 1 wherein the plurality of time increment steps comprise a plurality of variable time increment steps.

44. The controller of claim 30 wherein the plurality of time increment steps comprise a plurality of variable time increment steps.

45. The controller of claim 31 wherein the plurality of time increment steps comprise a plurality of variable time increment steps.

46. The controller of claim 32 wherein the plurality of time increment steps comprise a plurality of variable time increment steps.

* * * * *

UNITED STATES PATENT AND TRADEMARK OFFICE
CERTIFICATE OF CORRECTION

PATENT NO.      : 6,777,641 B2
DATED           : August 17, 2004
INVENTOR(S)     : Ira E. Cole, III et al.

It is certified that error appears in the above-identified patent and that said Letters Patent is hereby corrected as shown below:

Column 24,
Line 39, change "cool" to -- tool --.

Column 26,
Line 14, change "rime" to -- time --.

Signed and Sealed this

Eighth Day of February, 2005

JON W. DUDAS
*Director of the United States Patent and Trademark Office*